US012795433B2

(12) United States Patent
Jiang

(10) Patent No.: US 12,795,433 B2
(45) Date of Patent: Nov. 10, 2026

(54) METHODS, COMMUNICATION DEVICES, AND STORAGE MEDIA FOR SDT PROCESSING IN NON-TERRESTRIAL NETWORKS

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 317 days.

(21) Appl. No.: 18/405,377

(22) Filed: Jan. 5, 2024

(65) Prior Publication Data

US 2024/0205722 A1 Jun. 20, 2024

Related U.S. Application Data

(63) Continuation of application No. PCT/CN2021/105058, filed on Jul. 7, 2021.

(51) Int. Cl.
*H04W 28/02* (2009.01)
*H04W 56/00* (2009.01)

(52) U.S. Cl.
CPC ... *H04W 28/0226* (2013.01); *H04W 56/0045* (2013.01)

(58) Field of Classification Search
CPC ...................... H04W 28/0226; H04W 56/0045
USPC .......................................................... 370/230
See application file for complete search history.

(56) References Cited

U.S. PATENT DOCUMENTS

| | | | | |
|---|---|---|---|---|
| 11,963,237 | B2 * | 4/2024 | Mahalingam ...... | H04B 7/18506 |
| 2013/0080597 | A1 | 3/2013 | Liao | |
| 2015/0113128 | A1 | 4/2015 | Huang | |
| 2017/0064666 | A1 | 3/2017 | Zhang | |
| 2018/0192407 | A1 | 7/2018 | Chen et al. | |
| 2019/0159168 | A1 | 5/2019 | Wang et al. | |

(Continued)

FOREIGN PATENT DOCUMENTS

| | | | |
|---|---|---|---|
| CN | 102224745 | A | 10/2011 |
| CN | 104737617 | A | 6/2015 |

(Continued)

OTHER PUBLICATIONS

3GPP TR 38.821 V16.0.0-2019-12; 3GPP TSG Radio Access Network Solutions for NR to support non-terrestrial networks (NTN) (Release 16) (Year: 2019).*

(Continued)

*Primary Examiner* — Christopher M Crutchfield
*Assistant Examiner* — Syed M Ahmed
(74) *Attorney, Agent, or Firm* — Volpe Koenig

(57) ABSTRACT

This disclosure provides a method, communication device, and storage medium for Small Data Transmission (SDT) processing in a non-terrestrial network (NTN), applicable to NTN systems. In one example of the method, the terminal device determines the SDT transmission conditions based on its location information after determining the location information of the terminal device. Thus, by considering location information when applying SDT technology in the NTN, the near-far effects of signal quality in NTN cells can be covered when using signal quality as the determination criterion, effectively avoiding interference within the cells, thereby enabling the NTN to support SDT.

20 Claims, 4 Drawing Sheets

(56) References Cited

U.S. PATENT DOCUMENTS

| | | | | |
|---|---|---|---|---|
| 2019/0342845 | A1* | 11/2019 | Laselva | H04B 7/18504 |
| 2020/0029326 | A1 | 1/2020 | Wang et al. | |
| 2020/0404713 | A1* | 12/2020 | Sakhnini | H04B 7/1851 |
| 2020/0412443 | A1* | 12/2020 | Wang | H04W 68/005 |
| 2021/0029658 | A1* | 1/2021 | Mahalingam | H04B 7/18504 |
| 2022/0086713 | A1* | 3/2022 | Määttänen | H04W 36/00837 |
| 2022/0086780 | A1* | 3/2022 | Tsai | H04W 56/006 |
| 2022/0167297 | A1* | 5/2022 | Wang | H04W 56/00 |
| 2022/0232503 | A1* | 7/2022 | Cheng | H04W 56/009 |
| 2022/0272759 | A1 | 8/2022 | Grau et al. | |
| 2022/0272760 | A1* | 8/2022 | Murray | H04W 74/0836 |
| 2023/0007523 | A1* | 1/2023 | Fu | H04B 7/18504 |
| 2023/0354233 | A1* | 11/2023 | Cui | H04B 7/18541 |
| 2023/0379860 | A1* | 11/2023 | Rao | H04W 64/00 |
| 2023/0422195 | A1* | 12/2023 | Yao | H04W 56/0045 |
| 2024/0031960 | A1* | 1/2024 | Wu | H04B 7/18513 |
| 2024/0090045 | A1* | 3/2024 | Agiwal | H04W 74/0833 |
| 2024/0137886 | A1* | 4/2024 | Christoffersson | H04W 72/0446 |
| 2024/0151802 | A1* | 5/2024 | Thomas | G01S 5/0244 |
| 2024/0259088 | A1* | 8/2024 | Rune | H04B 7/18532 |
| 2024/0365268 | A1* | 10/2024 | Mahalingam | H04B 7/18513 |
| 2025/0151074 | A1* | 5/2025 | Jeon | H04W 52/0232 |

FOREIGN PATENT DOCUMENTS

| | | | |
|---|---|---|---|
| CN | 108718442 | A | 10/2018 |
| CN | 109644428 | A | 4/2019 |
| CN | 110753324 | A | 2/2020 |
| CN | 112291842 | A | 1/2021 |
| CN | 112806090 | A | 5/2021 |
| GB | 202002086 | | 4/2020 |
| WO | 2020087280 | A1 | 5/2020 |
| WO | 2020107416 | A1 | 6/2020 |
| WO | 2020204637 | A1 | 10/2020 |
| WO | 2021000289 | A1 | 1/2021 |
| WO | 2021083881 | A1 | 5/2021 |

OTHER PUBLICATIONS

3GPP TSG-RAN WG2 #113-e, R2-2101213, E-meeting, Jan. 25-Feb. 5, 2021, Huawei, HiSilicon, "Small data transmission with CG-based scheme" (Year: 2021).*

3GPP TSG-RAN2 Meeting #113 Electronic, R2-2100145, Jan. 25-Feb. 5, 2021, Samsung, "Configured Grant based Small Data Transmission" (Year: 2021).*

3GPP TSG-RAN WG4 Meeting # 99-e, R4-2108971, Electronic Meeting, May 19-27, 2021, Qualcomm Incorporated, "Timing requirements in NTN Systems" (Year: 2021).*

Moderator (Thales), "FL Summary on enhancements on UL time and frequency synchronization for NR NTN", R1-2009485, 3GPP TSG-RAN WG1 Meeting #103-e, e-Meeting, Oct. 26-Nov. 13, 2020 ,43 pages.

Vice Chairman (ZTE), "Report from Break-out session on R16 eMIMO, CLI, PRN, RACS and R17 NTN and Redcap", R2-2101952, 3GPP TSG-RAN WG2 Meeting #113 electronic Online, Feb. 10, 2021, 57 pages.

State Intellectual Property Office of the People's Republic of China, Office Action and Search Report Issued in Application No. 2021800021097, Jun. 21, 2024, 26 pages.

State Intellectual Property Office of the People's Republic of China, Rejection Decision Issued in Application No. 2021800021097, Aug. 28, 2024, 24 pages.

ISA State Intellectual Property Office of the People's Republic of China, International Search Report Issued in Application No. PCT/CN2021/105058, Feb. 25, 2022, WIPO, 4 pages.

State Intellectual Property Office of the People's Republic of China, Office Action and Search Report Issued in Application No. 2021800021097, Aug. 21, 2023, 15 pages.(Submitted with Machine/Partial Translation).

Huawei etc "Discussion on CG-based scheme" "3GPP TSG-RAN WG2 #112-e R2-2010281 Online, Nov. 2-13, 2020" Nov. 13, 2020, 17 pages.

OPPO "Discussion on CG-based SDT" "3GPP TSG-RAN WG2 #112-e R2-2009015 E-meeting, Nov. 2020" Nov. 30, 2020, 4 pages.

State Intellectual Property Office of the People's Republic of China, Office Action and Search Report Issued in Application No. 2021800021097, Mar. 29, 2024, 26 pages. (Submitted with Machine Translation).

Sony, "Consideration on RAN2 impacts of NTN support in NR", R2-1814740,3GPP TSG RAN WG2 Meeting #103bis, Chengdu, China, Oct. 8-12, 2018, 3 pages.

"Apple, ""On User Plane Latency reduction mechanisms in NTN Networks"", R2-2007105, 3GPP TSG RAN WG2 #111-e, e-Meeting, Aug. 17-28, 2020, 4 pages."

ISA State Intellectual Property Office of the People's Republic of China, Written Opinion of the International Searching Authority Issued in Application No. PCT/CN2021/105058, Feb. 25, 2022, WIPO, 7 pages.

Shen Xia, Liu Hui, "5G Random Access Technology Enhancements", Mobile Communications, 2020,44(4): 7-11, 5 pages.

* cited by examiner

METHODS, COMMUNICATION DEVICES, AND STORAGE MEDIA FOR SDT PROCESSING IN NON-TERRESTRIAL NETWORKS

CROSS-REFERENCE TO RELATED APPLICATION

The present application is a U.S. By-Pass Continuation of International Application No. PCT/CN2021/105058, filed on Jul. 7, 2021, the contents of which are incorporated herein by reference in their entirety for all purposes.

TECHNICAL FIELD

This disclosure relates to the field of communication technology, particularly to methods for Small Data Transmission (SDT) processing in a Non-Terrestrial Network (NTN), as well as communication devices and storage media thereof.

BACKGROUND

NTN communication is an important technology introduced in 5th Generation Mobile Communication Technology (5G), which provides wireless resources through satellites (or drones) instead of terrestrial base stations. The current SDT solution is primarily designed for Tenant Network (TN). However, how to apply SDT technology in the NTN to enable the NTN to support SDT has become an urgent issue to resolve.

SUMMARY

According to embodiments of this disclosure, a method for SDT processing in a non-terrestrial network is provided. The method is applicable to NTN systems, and by considering location information when applying SDT technology in the NTN, the near-far effect of signal quality in NTN cells can be covered when taking the signal quality as a determining condition, avoiding intra-cell interference, and thus enabling the NTN to support SDT.

In a first aspect, according to embodiments of the disclosure, a method for SDT processing in a non-terrestrial network is provided. The method can be executed by a terminal device and includes: determining location information of the terminal device; performing a determination of an SDT transmission condition based on the location information of the terminal device.

In this technical solution, by considering location information when applying SDT technology in the NTN, SDT can be supported in the NTN.

In an embodiment, performing the determination of the SDT transmission condition based on the location information of the terminal device includes: determining whether a Timing Advance (TA) value for the SDT is valid based on the location information of the terminal device.

In a possible embodiment, determining whether the TA value for the SDT is valid based on the location information of the terminal device includes: for the SDT using Configured Grant (CG) resource allocation, determining that the TA value is valid when the location information of the terminal device meets a first preset condition.

In this technical solution, the change factor in the location of the terminal device is considered when determining the validity of the TA value, which allows valid TA values to be used by the terminal device for time alignment, ensuring time synchronization with corresponding network-side device(s), enabling correct decoding of uplink data, and avoiding intra-cell interference.

In a possible embodiment, determining the TA value for the SDT is valid based on the location information of the terminal device includes: for the SDT using CG resource allocation, determining that the TA value is valid when the location information of the terminal device meets a first preset condition and Reference Signal Receiving Power (RSRP) change information meets a first change condition.

In this technical solution, the change factor in the location of the terminal device and the RSRP change information are combined to determine the validity of the TA value, which allows valid TA values can be used by the terminal device for time alignment, ensuring time synchronization with corresponding network-side device(s), enabling correct decoding of uplink data, and avoiding intra-cell interference.

Optionally, the location information of the terminal device meeting the first preset condition includes at least one of the following: the increase in a distance from the terminal device to a network-side device compared to a last obtained or recorded distance is equal to or less than a first distance threshold; the decrease in the distance from the terminal device to the network-side device compared to the last obtained or recorded distance is equal to or less than the first distance threshold; the increase in a round trip time (RTT) between the terminal device and the network-side device compared to the last obtained or recorded RTT between the terminal device with the network-side device is equal to or less than a first time threshold; the decrease in the RTT between the terminal device with the network-side device compared to the last obtained or recorded RTT between the terminal device with the network-side device is equal to or less than the first time threshold; the increase in the TA value estimated by the terminal device compared to the currently used TA value is equal to or less than a first TA threshold; or the decrease in the TA value estimated by the terminal device compared to the currently used TA value is equal to or less than the first TA threshold.

Optionally, the RSRP change information meeting the first change condition includes: the absolute value of a difference between the current measured RSRP value of the downlink pathloss reference and the stored RSRP value of the downlink pathloss reference is less than a first RSRP threshold.

In an embodiment, performing the determination of the SDT transmission condition based on the location information of the terminal device includes determining whether to initiate the SDT based on the location information of the terminal device.

In a possible embodiment, determining whether to initiate the SDT based on the location information of the terminal device includes: determining whether the location information of the terminal device meets a second preset condition; in response to the location information of the terminal device meeting the second preset condition, initiating the SDT.

In this technical solution, by determining whether to initiate the SDT based on the location information of the terminal device, SDT can be supported in the NTN.

In a possible embodiment, determining whether to initiate the SDT based on the location information of the terminal device includes: determining whether the location information of the terminal device meets a second preset condition; determining whether the RSRP change information meets a second change condition; in response to the location information of the terminal device meeting the second preset condition and the RSRP change information meeting the second change condition, determining to initiate the SDT.

In this technical solution, by combining the change factor in the location of the terminal device and the RSRP change information to determine whether to initiate the SDT, the near-far effect of signal quality in NTN cells can be covered, avoiding intra-cell interference, and thus enabling the NTN to support SDT.

Optionally, the location information of the terminal device meeting the second preset condition includes at least one of the following: the distance from the terminal device to a network-side device is less than a second distance threshold; the RTT between the terminal device with the network-side device is less than a second time threshold; the increase in the TA value estimated by the terminal device compared to the currently used TA value is equal to or less than a second TA threshold; the decrease in the TA value estimated by the terminal device compared to the currently used TA value is equal to or less than the second TA threshold.

Optionally, the RSRP change information meeting the second change condition includes the current measured RSRP value of the downlink pathloss reference is greater than a second RSRP threshold.

In an embodiment, performing the determination of the SDT transmission condition based on the location information of the terminal device includes, based on the location information of the terminal device, determining whether to initiate message 3 (Msg3) of a four-step random access process for initial access of the SDT or to initiate message A (MsgA) of a two-step random access process for initial access of the SDT.

In a possible embodiment, based on the location information of the terminal device, determining whether to initiate Msg3 of the four-step random access process for initial access of the SDT or to initiate MsgA of the two-step random access process for initial access of the SDT, includes: determining whether the location information of the terminal device meets a third preset condition; in response to the location information of the terminal device meeting the third preset condition, initiating MsgA of the two-step random access process for initial access of the SDT; in response to the location information of the terminal device not meeting the third preset condition, initiating Msg3 of the four-step random access process for initial access of the SDT.

In this technical solution, by determining whether to initiate Msg3 of the four-step random access process for initial access of the SDT or to initiate MsgA of the two-step random access process for initial access of the SDT based on the location information of the terminal device, the SDT can be supported in the NTN.

In an optional embodiment, based on the location information of the terminal device, determining whether to initiate Msg3 of the four-step random access process for initial access of the SDT or to initiate MsgA of the two-step random access process for initial access of the SDT, includes: determining whether the location information of the terminal device meets a third preset condition; determining whether the RSRP change information meets a third change condition; in response to the location information of the terminal device meeting the third preset condition and the RSRP change information meeting the third change condition, initiating MsgA of the two-step random access process for initial access of the SDT; in response to the location information of the terminal device not meeting the third preset condition, and/or the RSRP change information not meeting the third change condition, initiating Msg3 of the four-step random access process for initial access of the SDT.

Optionally, the location information of the terminal device meeting the third preset condition includes at least one of the following: the distance from the terminal device to the network-side device is less than a third distance threshold; the RTT between the terminal device with the network-side device is less than a third time threshold; the increase in the TA value estimated by the terminal device compared to the currently used TA value is equal to or less than a third TA threshold; the decrease in the TA value estimated by the terminal device compared to the currently used TA value is equal to or less than the third TA threshold.

Optionally, the RSRP change information meeting the third change condition includes: the current measured RSRP value of the downlink pathloss reference is greater than a third RSRP threshold.

In this technical solution, by combining the change factor in the location of the terminal device and the RSRP change information to determine whether to initiate Msg3 of a four-step random access process for initial access of the SDT or to initiate MsgA of a two-step random access process for initial access of the SDT, the near-far effect of signal quality in NTN cells can be covered, avoiding intra-cell interference, and thus enabling the NTN to support SDT.

In an embodiment, performing the determination of the SDT transmission condition based on the location information of the terminal device includes: determining whether to initiate the SDT on Supplement UpLink (SUL) or on Normal UpLink (NUL) based on the location information of the terminal device.

In a possible embodiment, determining whether to initiate the SDT on SUL or on NUL based on the location information of the terminal device includes: determining whether the location information of the terminal device meets a fourth preset condition; in response to the location information of the terminal device meeting the fourth preset condition, initiating the SDT on SUL; and in response to the location information of the terminal device not meeting the fourth preset condition, initiating the SDT on NUL.

In this technical solution, whether to initiate the SDT on SUL or on NUL is determined based on the location information of the terminal device, i.e., considering the location information when determining whether to initiate the SDT on SUL or on NUL. This allows the NTN to support SDT.

Optionally, the location information of the terminal device meeting the fourth preset condition includes at least one of the following: the distance from the terminal device to the network-side device is greater than a fourth distance threshold; the RTT between the terminal device with the network-side device is greater than a fourth time threshold; the increase in the TA value estimated by the terminal device compared to the currently used TA value is equal to or greater than a fourth TA threshold; the decrease in the TA value estimated by the terminal device compared to the currently used TA value is equal to or greater than the fourth TA threshold.

In a possible embodiment, determining whether to initiate the SDT on SUL or on NUL based on the location information of the terminal device includes: determining whether the location information of the terminal device meets a fifth preset condition; determining whether the RSRP change information meets a fourth change condition; in response to the location information of the terminal device meeting the fifth preset condition and the RSRP change information meeting the fourth change condition, initiating the SDT on NUL; in response to the location information of the terminal device not meeting the fifth preset condition, and/or the RSRP change information not meeting the fourth change condition, initiating the SDT on SUL. Where the location information of the terminal device meeting the fifth preset condition includes at least one of the following: the distance from the terminal device to the network-side device is less than a fifth distance threshold; the RTT between the terminal device and the network-side device is less than a fifth time threshold. Furthermore, the RSRP change information meeting the fourth change condition includes: the current measured RSRP value of the downlink pathloss reference is greater than a fourth RSRP threshold.

In this technical solution, whether to initiate the SDT on SUL or on NUL is determined based on a combination of the change factor in the location of the terminal device and the RSRP change information, i.e., the change factor in the location of the terminal device and the RSRP change information both are considered when determining whether to initiate the SDT on SUL or on NUL. This allows the near-far effect of signal quality in NTN cells can be covered, avoiding intra-cell interference, and thus enabling the NTN to support SDT.

In a possible embodiment, determining whether to initiate the SDT on SUL or on NUL based on the location information of the terminal device includes: determining whether the location information of the terminal device meets a sixth preset condition; determining whether the RSRP change information meets a fifth change condition; in response to the location information of the terminal device meeting the sixth preset condition and the RSRP change information meeting the fifth change condition, initiating the SDT on SUL; in response to the location information of the terminal device not meeting the sixth preset condition, and/or the RSRP change information not meeting the fifth change condition, initiating the SDT on NUL. Where the location information of the terminal device meeting the sixth preset condition includes at least one of the following: the distance from the terminal device to the network-side device is greater than a sixth distance threshold; the RTT between the terminal device and the network-side device is greater than a sixth time threshold. Furthermore, the RSRP change information meeting the fifth change condition includes: the current measured RSRP value of the downlink pathloss reference is less than a fifth RSRP threshold.

In this technical solution, whether to initiate the SDT on SUL or on NUL is determined based on a combination of the change factor in the location of the terminal device and the RSRP change information, i.e., the change factor in the location of the terminal device and the RSRP change information both are considered when determining whether to initiate the SDT on SUL or on NUL. This allows the near-far effect of signal quality in NTN cells to be covered, avoiding intra-cell interference, and thus enabling the NTN to support SDT.

In an embodiment, performing the determination of the SDT transmission condition based on the location information of the terminal device includes determining whether a Time Alignment Timer (TAT) has timed out based on the location information of the terminal device.

In a possible embodiment, determining whether the TAT has timed out based on the location information of the terminal device includes determining whether the location information of the terminal device meets a seventh preset condition, and in response to the location information of the terminal device meeting the seventh preset condition, determining that the TAT has timed out.

Optionally, the location information of the terminal device meeting the seventh preset condition includes at least one of the following: the distance from the terminal device to the network-side device is greater than a seventh distance threshold; the RTT between the terminal device with the network-side device is greater than a seventh time threshold; the increase in the TA value estimated by the terminal device compared to the currently used TA value is equal to or greater than a fifth TA threshold; the decrease in the TA value estimated by the terminal device compared to the currently used TA value is equal to or greater than the fifth TA threshold.

In this technical solution, whether the TAT has timed out is determined based on the location information of the terminal device, i.e., the location information of the terminal device is considered when determining whether the TAT has timed out. This enables the terminal device to handle abnormal processes of the link when determining that the TAT has timed out, thereby perfecting the communication process of NTN systems, ensuring normal communication operations of the NTN systems, and enabling the NTN to support SDT.

In an embodiment, the method further includes: in a case a timer starts timing after transmission is initiated on a dedicated Physical Uplink Shared Channel (PUSCH) resource configured by the NTN, performing an enhanced process on the timer.

In an optional embodiment, performing the enhanced process on the timer includes: offsetting the start time of the timer by one RTT between the terminal device and the base station; or increasing the timing value of the timer by one RTT between the terminal device and the base station.

Optionally, the timer may be any one of the following: a configured grant timer for the SDT; a configured grant retransmission timer for the SDT; a first preset timer, the terminal device is allowed to initiate retransmission automatically after the first preset timer has timed out, that is, the terminal device is not allowed to initiate uplink retransmission automatically until the first preset timer has timed out; or a second preset timer, the terminal device waits for feedback from the base station during the second preset timer timing.

Optionally, the first preset timer and/or the second preset timer are for the dedicated PUSCH resources configured by the NTN.

In this technical solution, by performing an enhanced process on the timer which starts timing after transmission is initiated on the dedicated PUSCH resources configured by the NTN (also known as CG SDT), such as offsetting the start time of the timer by one RTT between the terminal device with the base station or increasing the timing value of the timer by one RTT, the timer is adapted to the NTN. This perfects the communication process of NTN systems, ensures normal communication operations of the NTN systems, and thus enables the NTN to support SDT.

In a second aspect, according to embodiments of this disclosure, a method for SDT processing in a non-terrestrial network is provided. The method can be executed by a network-side device and includes: receiving an SDT random access request sent by terminal device, where the SDT random access request carries an SDT indication, which is configured to inform the network-side device that wireless access signaling will be used to carry small data packets; in response to the SDT random access request, sending a random access response to the terminal device, where the random access response carries the uplink configured grant resource allocated to the terminal device and threshold configuration information, and the threshold configuration information is used as a determining criterion for the terminal device to perform a determination of an SDT transmission condition based on location information of the terminal device.

In a third aspect, according to embodiments of the disclosure, a communication device is provided. The communication device has a part of or all the functions of the terminal device as described in the first aspect, such as having the functions described in some or all the embodiments of this disclosure, or having the function described in any single embodiment in this disclosure. The functions can be implemented by hardware or by hardware executing corresponding software. The hardware or software may include one or more units or modules corresponding to the included functions.

In an embodiment, the structure of this communication device may include a transceiver module and a processing module, where the processing module is configured to support the communication device to realize the corresponding functions described in the included methods. The transceiver module is configured to support the communication device to communicate with other devices. The communication device may also include a storage module, coupled with the transceiver module and the processing module, which stores computer programs and data necessary for the communication device. For example, the processing module can be a processor, the transceiver module can be a transceiver or communication interface, and the storage module can be a memory.

In a fourth aspect, according to embodiments of the disclosure, another communication device is provided. The communication device has a part of or all the functions of the network-side device as described in the second aspect, such as having the functions described in some or all the embodiments of this disclosure, or having the function described in any single embodiment in this disclosure. The functions can be implemented by hardware or by hardware executing corresponding software. The hardware or software may include one or more units or modules corresponding to the included functionalities.

In an embodiment, the structure of this communication device may include a transceiver module and a processing module, where the processing module is configured to enable the communication device to perform the corresponding functions described in the methods herein. The transceiver module is configured to support the communication device to communicate with other devices. The communication device may also include a storage module, coupled with the transceiver module and the processing module, which stores computer programs and data necessary for the communication device. For example, the processing module can be a processor, the transceiver module can be a transceiver or communication interface, and the storage module can be a memory.

In a fifth aspect, according to embodiments of the disclosure, another communication device is provided. The communication device includes a processor, which, when invoking computer programs stored in a memory, executes the method as described in the first aspect.

In a sixth aspect, according to embodiments of the disclosure, another communication device is provided. The communication device includes a processor, which, when invoking computer programs stored in a memory, executes the method as described in the second aspect.

In a seventh aspect, according to embodiments of the disclosure, another communication device is provided. The communication device includes a processor and a memory, where the memory stores computer programs; the processor executes the computer programs stored in the memory, enabling the communication device to perform the method as described in the first aspect.

In an eighth aspect, according to embodiments of the disclosure, another communication device is provided. The communication device includes a processor and a memory, where the memory stores computer programs; the processor executes the computer programs stored in the memory, enabling the communication device to perform the method as described in the second aspect.

In a ninth aspect, according to embodiments of the disclosure, another communication device is provided. The communication device includes a processor and an interface circuit, where the interface circuit is configured to receive code instructions and transmit them to the processor, which runs the code instructions to enable the communication device to perform the method as described in the first aspect.

In a tenth aspect, according to embodiments of the disclosure, another communication device is provided. The communication device includes a processor and an interface circuit, where the interface circuit is configured to receive code instructions and transmit them to the processor, which runs the code instructions to enable the communication device to perform the method as described in the second aspect.

In an eleventh aspect, according to embodiments of the disclosure, a communication system is provided. The communication system includes the communication device as described in the third aspect and the communication device as described in the fourth aspect, or the communication system includes the communication device as described in the fifth aspect and the communication device as described in the sixth aspect, or the communication system includes the communication device as described in the seventh aspect and the communication device as described in the eighth aspect, or the communication system includes the communication device as described in the ninth aspect and the communication device as described in the tenth aspect.

In a twelfth aspect, according to embodiments of the disclosure, a computer-readable storage medium is provided. The computer-readable storage medium is configured to store instructions for use with the aforementioned communication device. When executed, these instructions cause the communication device to perform the method described in the first aspect.

In a thirteenth aspect, according to embodiments of the disclosure, a computer-readable storage medium is provided. The computer-readable storage medium is configured to store instructions for use with the aforementioned communication device. When executed, these instructions cause the communication device to perform the method described in the second aspect.

In a fourteenth aspect, according to embodiments of this disclosure, a computer program product including a computer program is provided. When executed on a computer, the computer program causes the computer to perform the method described in the first aspect.

In a fifteenth aspect, according to embodiments of this disclosure, a computer program product including a computer program is provided. When executed on a computer, the computer program causes the computer to perform the method described in the second aspect.

In a sixteenth aspect, according to embodiments of this disclosure, a computer program is provided. When executed on a computer, the computer program causes the computer to perform the method described in the first aspect.

In a seventeenth aspect, according to embodiments of this disclosure, a computer program is provided. When executed on a computer, the computer program causes the computer to perform the method described in the second aspect.

BRIEF DESCRIPTION OF THE DRAWINGS

To illustrate the technical solutions in the embodiments of this disclosure or in the background art more clearly, the drawings used in the embodiments or background art will be briefly described below.

DETAILED DESCRIPTION OF EMBODIMENTS

The embodiments of this disclosure are described in detail below, with examples shown in the accompanying drawings, where the same or similar numbers represent the same or similar elements or elements with the same or similar functions throughout. The embodiments described through reference to the drawings are illustrative and are intended to explain this disclosure and should not be construed as limiting this disclosure. In the description of this disclosure, unless otherwise specified, "/" represents the meaning of or, for example, A/B can represent A or B; the term "and/or" in this document is just a description of the association of associated objects, indicating that there can be three relationships, for example, A and/or B can represent the situations where A exists alone, both A and B exist together, or B exists alone.

For a better understanding of the method for SDT processing in a non-terrestrial network disclosed in the embodiments of this disclosure, the communication system used in the embodiments of this disclosure is first described.

Figure 1:
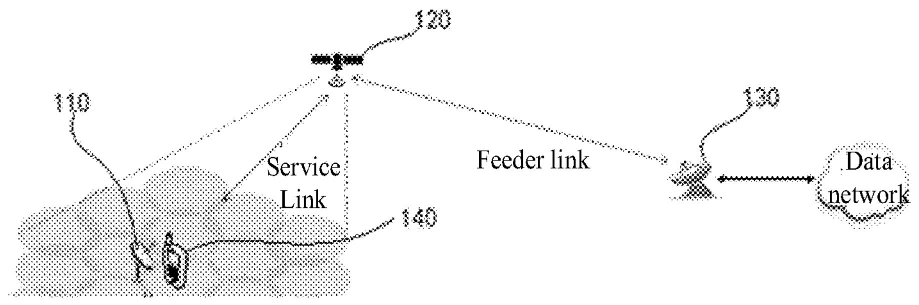
FIG. 1 illustrates the architecture of a communication system schematically according to an embodiment of this disclosure.

FIG. 1 is a schematic diagram of a communication system architecture according to an embodiment of this disclosure. This communication system may include, but is not limited to, a base station, a satellite, a ground station, and a terminal device. The number and form of devices shown in FIG. 1 are for example only and do not limit the embodiments of this disclosure. In actual applications, the communication system can include two or more base stations, two or more satellites, two or more ground stations, and two or more terminal devices. For example, the communication system shown in FIG. 1 can include a base station 110, a satellite 120, a ground station 130, and a terminal device 140. The base station 110, satellite 120, and ground station 130 are described in detail herein with reference to other figures. Any description, functions, or entities described herein with respect to a base station, satellite, or ground station can be applied to the base station 110, satellite 120, and ground station 130, respectively.

The terminal device 140 in the embodiments of this disclosure is an entity on the user side for receiving or transmitting signals, such as a mobile phone. The terminal device 140 can also be referred to as a terminal, user equipment (UE), mobile station (MS), mobile terminal (MT), etc. The terminal device 140 can be a car with communication functions, a smart car, a mobile phone, a wearable device, a tablet (Pad), a computer with wireless receiving and transmitting functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The embodiments of this disclosure do not limit the specific technology and specific device form used for the terminal device 140.

The technical solutions in the embodiments of this disclosure can be applied to Non-Terrestrial Network (NTN) communication systems. NTN is an important technology introduced in 5G, which provides wireless resources through satellites (or drones) rather than terrestrial base stations. Depending on the method of processing satellite signal, it can be divided into transparent mode and regenerative mode.

Figure 2:
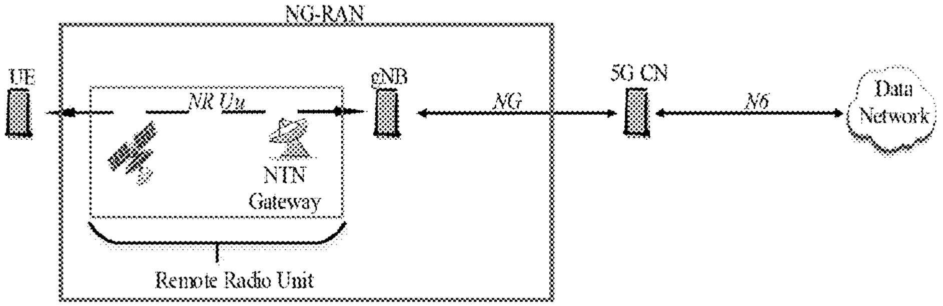
FIG. 2 illustrates an example of the satellite in the NTN processing signal according to an embodiment of this disclosure.

In transparent mode, as shown in FIG. 2, the NTN ground station sends the signal from the base station (also named as gNB signal) to the satellite, which then converts the signal to the frequency band of the satellite and transmits it to the UE via the frequency band of the satellite. Apart from frequency conversion and signal amplification, the satellite does not demodulate the gNB signal. In other words, in this mode, the satellite acts similarly to a repeater.

Figure 3:
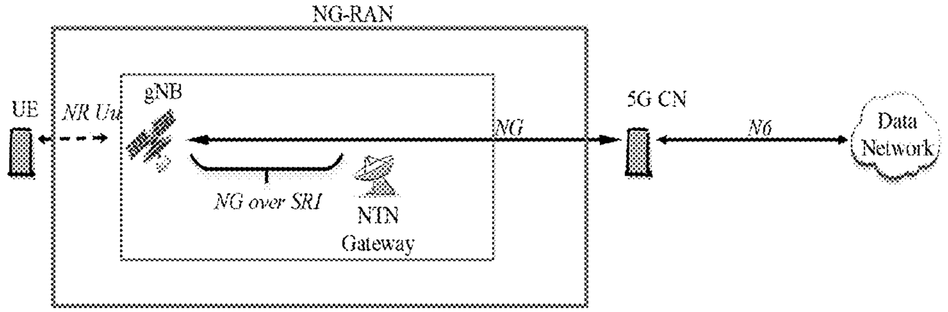
FIG. 3 illustrates another example of the satellite in the NTN processing signal according to another embodiment of this disclosure.

In regenerative mode, as shown in FIG. 3, after the NTN ground station sends the signal from the gNB to the satellite, the satellite demodulates and decodes the signal, then re-encodes and modulates it (this process is called regeneration), and transmits the regenerated signal via the frequency band of the satellite.

The communication system described in the embodiments of this disclosure is for a clearer explanation of the technical solutions of these embodiments and does not constitute a limitation to the technical solutions provided in these embodiments. As those skilled in the art will appreciate, with the evolution of system architecture and the emergence of new business scenarios, the technical solutions provided in the embodiments of this disclosure are equally applicable to solve similar technical problems.

The methods for SDT processing in a non-terrestrial network, as well as communication devices and storage media thereof according to embodiments of this disclosure, are now described in detail with reference to the accompanying drawings.

First, the technical background involved in this disclosure is introduced.

Uplink Configured Grant (CG), as opposed to uplink dynamic scheduling, refers to a resource allocation method where resources are pre-configured periodic uplink resources. Once configured for the UE, at each subsequent periodic moment, the corresponding uplink resources can be used by the UE directly, without the base station needing to instruct the UE again. Similarly, downlink Semi-Persistent Scheduling (SPS) is similar to the uplink Configured Grant, with the difference being that it is used for downlink resources.

For uplink Configured Grant, two timers are configured: Configured Grant Timer (CG-Timer) and Configured Grant Retransmission Timer (CG-RetransmissionTimer). Specifically, each time the UE transmits new uplink data on a Hybrid Automatic Repeat Request (HARQ) process, the CG-Timer corresponding to the HARQ process starts timing. During the CG-Timer timing, no other new transmissions can be scheduled on the HARQ process. The CG-RetransmissionTimer, which can be configured per CG, is used for automatic uplink retransmission. Each time the UE initiates a new uplink transmission or retransmission on a HARQ process, the CG-RetransmissionTimer corresponding to the HARQ process starts timing, and no automatic uplink retransmission can be performed during the CG-RetransmissionTimer timing. Upon the CG-RetransmissionTimer ends the timing, the UE is allowed to initiate uplink automatic retransmission. Currently, the CG-RetransmissionTimer can only be used in a case where the UE selects the HARQ ID corresponding to the CG by itself.

For Discontinuous Reception (DRX), a plurality of timers can be configured, including the uplink DRX HARQ Round Trip Time Timer (drx-HARQ-RTT-TimerUL) and the downlink DRX HARQ Round Trip Time Timer (drx-HARQ-RTT-TimerDL). The drx-HARQ-RTT-TimerUL represents the minimum time interval for the UE to receive an uplink retransmission schedule after uplink transmission. Specifically, each time the UE transmits uplink data, the drx-HARQ-RTT-TimerUL starts timing, and upon the drx-HARQ-RTT-TimerUL ends the timing, the drx-RetransmissionTimerUL starts timing. During the drx-RetransmissionTimerUL timing, the UE listens for dynamic scheduling of uplink retransmission from the base station. Similarly, the drx-HARQ-RTT-TimerDL represents the minimum time interval for the UE to receive a downlink retransmission schedule after sending uplink HARQ feedback for downlink data. Specifically, each time the UE sends uplink HARQ feedback for downlink data, the drx-HARQ-RTT-TimerDL starts timing, and upon the drx-HARQ-RTT-TimerDL ends the timing, the drx-RetransmissionTimerDL starts timing. During the drx-RetransmissionTimerDL timing, the UE listens for dynamic scheduling of uplink retransmission from the base station.

Currently, for NTN, people are researching the enable/disable HARQ feedback function. If the HARQ feedback function is disabled, the receiving side does not provide HARQ feedback in response to the sending side completing data transmission. Also, for NTN, people are further researching the blind retransmission function for HARQ with the feedback function disabled. If the blind retransmission function is enabled, the sending side automatically performs one or more blind retransmissions of the data.

Introduction to SDT: According to the resources configured by the network side, when in IDLE or INACTIVE state, the UE can send data directly to the network side device through the following ways.

1) Msg3 of Four-step random access process for initial access (also known as 4-step RACH SDT).
2) MsgA of Two-step random access process for initial access (also known as 2-step RACH SDT).
3) Dedicated Physical Uplink Shared Channel (PUSCH) resources configured by network, i.e., CG or Preallocated Uplink Resource (PUR), also known as CG SDT.

Figure 4A:
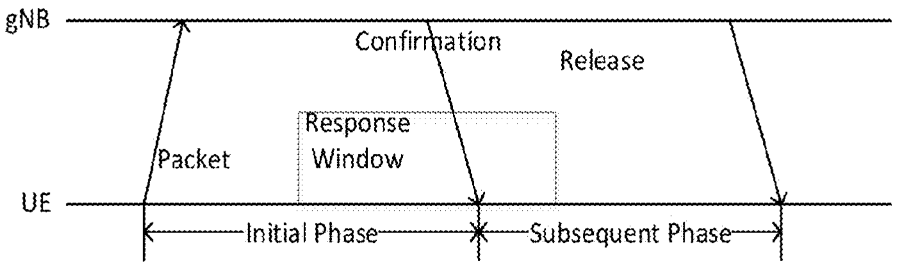
FIG. 4A illustrates an example of the SDT process.

As shown in FIG. 4A, the SDT process can include an initial data transmission stage and a subsequent data transmission stage. The initial data transmission stage is from triggering the SDT for transmitting initial data to receiving the confirmation information for the initial data from the network side. The confirmation information, depending on the SDT process, can be one of the following three types: (1) For 4-step RACH SDT, the confirmation information is the contention resolution identifier for the successful reception of Msg4; (2) For 2-step RACH SDT, the confirmation information is the contention resolution identifier for the successful reception of MsgB; (3) For CG SDT, the confirmation information is the data reception success indication sent by the network (such as, the Acknowledgment (ACK) information indicated by the physical layer Downlink Control Information (DCI)). The subsequent data transmission stage is from receiving the confirmation information for the initial data from the network side to receiving the connection release message from the network side. During this stage, the UE can perform uplink and downlink data transmission and reception.

Figure 4B:
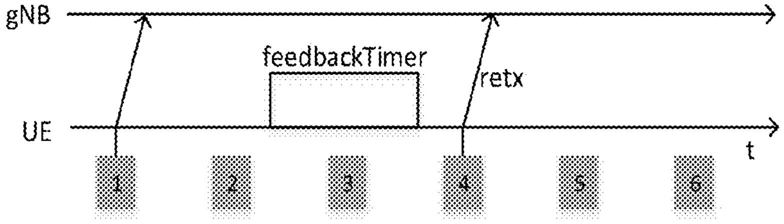
FIG. 4B illustrates an example of the CG-SDT process.

As shown in FIG. 4B, for network-configured CG-SDT resources, after the UE transmits data using the CG resources, a feedback timer (feedbackTimer) starts timing for the UE to listen for feedback information from the network side. If the UE does not receive successful reception confirmation from the network side during the feedback timer timing, it will retransmit data on subsequent CG resources. For uplink CG, each time the UE initiates new uplink data transmission on a HARQ process, the CG-Timer corresponding to the HARQ process starts timing, and during the CG-Timer timing, no other new transmissions can be scheduled on the HARQ process. The CG-RetransmissionTimer can be configured per CG and used for uplink automatic retransmission. Each time the UE initiates a new uplink transmission or retransmission on a HARQ process, the CG-RetransmissionTimer corresponding to the HARQ process starts timing, and the UE would not initiate uplink automatic retransmission during the CG-RetransmissionTimer timing. Upon the CG-RetransmissionTimer ends the timing, the UE is allowed to initiate uplink automatic retransmission.

However, current SDT solutions are primarily designed for the TN. If SDT is applied in the NTN, due to the near-far effect of signal quality in NTN cells (where signal quality does not change significantly with distance from the cell center), it is necessary to give priority to considering location changes when using signal quality as a determining condition. Furthermore, since the RTT in the NTN is relatively long, and some timers for SDT need to consider feedback delay, the timers need to be enhanced.

Figure 5:
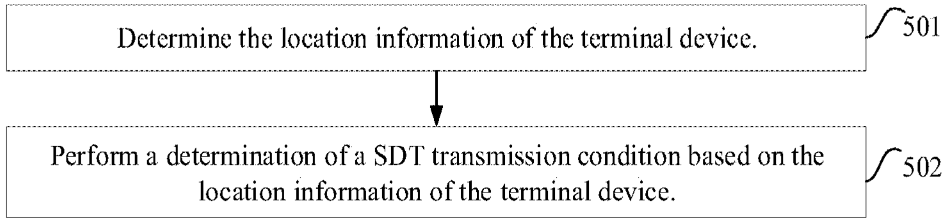
FIG. 5 illustrates a flowchart of a method for SDT processing in a non-terrestrial network according to an embodiment of this disclosure.

Therefore, to enable the NTN to support SDT technology, this disclosure proposes a method for SDT processing in a non-terrestrial network. By considering the location information of the terminal device when applying SDT in the NTN, the NTN can support SDT processing. FIG. 5 illustrates a flowchart of a method for SDT processing in a non-terrestrial network according to an embodiment of this disclosure. The method for SDT processing in a non-terrestrial network according to this embodiment can be applied to a terminal device. As shown in FIG. 5, the method for SDT processing in a non-terrestrial network can include, but is not limited to, the following steps 501 and 502.

At step 501: Determine the location information of the terminal device.

In an embodiment, the terminal device can determine its location information through its own positioning system. Alternatively, the terminal device can also use other methods to determine its location information. As an example, the terminal device can determine its location information based on signal quality parameters. The method of determining the location information of the terminal device is not specifically limited in this disclosure.

In some embodiments of this disclosure, the location information can be understood as the distance from the terminal device to the center of the NTN cell (such as the distance to the network-side device). Alternatively, the location information in this disclosure can also be understood as geographical location information comprising latitude and longitude coordinates of the Earth. The content and form of this location information can be decided based on the actual application, and this disclosure does not specifically limit it.

At step 502: Perform a determination of an SDT transmission condition based on the location information of the terminal device.

In the embodiments of this disclosure, performing the determination of the SDT transmission condition includes at least one or more of the following: determining whether the TA value for the SDT is valid; determining whether to initiate the SDT; determining whether to initiate Msg3 of a four-step random access process for initial access of the SDT, or to initiate MsgA of a two-step random access process for initial access of the SDT; determining whether to initiate the SDT on SUL or on NUL; determining whether the TAT has timed out.

In some embodiments of this disclosure, step 502 may include: determining whether the TA value for the SDT is valid based on the location information of the terminal device; or determining whether to initiate the SDT based on the location information of the terminal device; or, based on the location information of the terminal device, determining whether to initiate Msg3 of the four-step random access process for initial access of the SDT, or to initiate MsgA of the two-step random access process for initial access of the SDT; or determining whether to initiate the SDT on SUL or on NUL based on the location information of the terminal device; or determining whether the TAT has timed out based on the location information of the terminal device.

Optionally, after determining its location information, the terminal device can perform one or more of the following actions based on its location information: determining whether the TA value for the SDT is valid; determining whether to initiate the SDT; determining whether to initiate Msg3 of the four-step random access process for initial access of the SDT, or to initiate MsgA of the two-step random access process for initial access of the SDT; determining whether to initiate the SDT on SUL or on NUL; and determining whether the TAT has timed out.

That is, after determining its location information, the terminal device can determine whether the TA value is valid based on its location information; and/or the terminal device can determine whether to initiate the SDT based on its location information; and/or the terminal device can determine, based on its location information, whether to initiate Msg3 of the four-step random access process for initial access of the SDT or to initiate MsgA of the two-step random access process for initial access of the SDT; and/or the terminal device can determine whether to initiate the SDT on SUL or on NUL based on its location information; and/or the terminal device can determine whether the TAT has timed out based on its location information.

By implementing the embodiments of this disclosure, location information is considered when applying SDT technology in the NTN, which allows the NTN to support SDT.

Due to the near-far effect of signal quality in NTN cells (where signal quality does not change significantly with distance from the cell center), to enable the NTN to support SDT, it is necessary to give priority to considering location changes of the terminal device when using signal quality as a determining condition. That is, the location information of the terminal device needs to be considered when applying SDT in the NTN. The following will describe, with reference to the drawings, where, in the process of applying SDT in the NTN, the changes in the location of the terminal device need to be considered.

Figure 6:
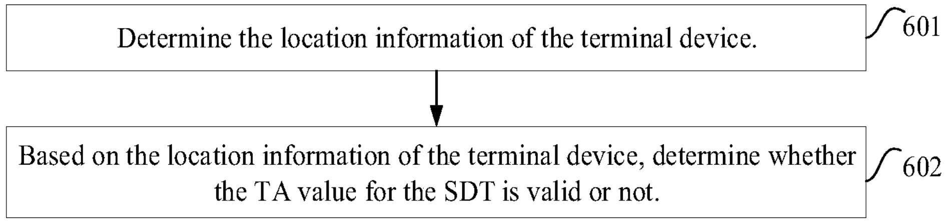
FIG. 6 illustrates a flowchart of a method for SDT processing in a non-terrestrial network according to another embodiment of this disclosure.

FIG. 6 illustrates a flowchart of a method for SDT processing in a non-terrestrial network according to another embodiment of this disclosure. It should be noted that the method for SDT processing in a non-terrestrial network according to this embodiment can be applied to a terminal device. As shown in FIG. 6, the method for SDT processing in a non-terrestrial network can include, but is not limited to, the following steps 601 and 602.

Step 601: Determine the location information of the terminal device.

In the embodiments of this disclosure, step 601 can be implemented using any method described in various embodiments of this disclosure, which is not reiterated here, and this disclosure does not limit it.

Step 602: Based on the location information of the terminal device, determine whether the TA value for the SDT is valid or not.

In some embodiments of this disclosure, for SDT using CG resource allocation, when the location information of the terminal device meets the first preset condition, the TA value for the SDT is determined to be valid.

It can be understood that uplink grant-free (non-dynamic scheduling) refers to once the gNB performs an uplink grant to the UE by activation, the UE is allowed to continue using the specified resources for uplink transmission until receiving a deactivation. There are two types of transmissions for this: Configured Grant type 1 and Configured Grant type 2.

Configured Grant type 1: Configured by Radio Resource Control (RRC) through higher-layer signaling (IE ConfiguredGrantConfig).

Configured Grant type 2: Instructed by DCI to activate or deactivate uplink grant-free, where the required parameters are configured by IE ConfiguredGrantConfig, but can be used only when activated by DCI.

Configured Grant types 1 and 2 are distinguished based on the field rrc-ConfiguredUplinkGrant in IE ConfiguredGrantConfig. Specifically, if the rrc-ConfiguredUplinkGrant field is configured, it is determined to be Configured Grant type 1; if the field is not configured, it is determined to be Configured Grant type 2.

Optionally, in some embodiments of this disclosure, the Configured Grant can be a Configured Grant type 1. That is, for SDT using Configured Grant type 1 resource allocation, when the location information of the terminal device meets the first preset condition, the TA value for the SDT is determined to be valid.

In an embodiment, the location information of the terminal device meeting the first preset condition includes at least one of the following: the increase in the distance from the terminal device to the network-side device compared to the last obtained or recorded distance from the terminal device to the network-side device is equal to or less than the first distance threshold; the decrease in the distance from the terminal device to the network-side device compared to the last obtained or recorded distance from the terminal device to the network-side device is equal to or less than the first distance threshold; the increase in the RTT between the terminal device with the network-side device compared to the last obtained or recorded RTT between the terminal device with the network-side device is equal to or less than the first time threshold; the decrease in the RTT between the terminal device with the network-side device compared to the last obtained or recorded RTT between the terminal device with the network-side device is equal to or less than the first time threshold; the increase in the TA value estimated by the terminal device compared to the currently used TA value is equal to or less than the first TA threshold; the decrease in the TA value estimated by the terminal device compared to the currently used TA value is equal to or less than the first TA threshold. The first distance threshold and the first time threshold can be configured per CG.

Optionally, in this embodiment, the terminal device obtains or records the distance or the RTT between the terminal device and the network-side device when receiving the TA command from the network-side device; the last obtained or recorded distance or RTT refers to the distance or RTT obtained or recorded by the terminal device when it received the TA command last time.

For example, supposing the terminal device obtains or records the distance from the terminal device to the network-side device when receiving the TA command, and compares the current obtained or recorded distance from the terminal device to the network-side device with the last obtained or recorded distance from the terminal device to the network-side device, if the change (increase or decrease) in the current obtained or recorded distance from the terminal device to the network-side device compared to the last obtained or recorded distance from the terminal device to the network-side device is equal to or less than the first distance threshold, then the location information of the terminal device is considered to meet the first preset condition. Similarly, supposing the terminal device obtains or records the RTT between the terminal device with the network-side device when receiving the TA command, and compares the current obtained or recorded RTT between the terminal device with the network-side device with the last obtained or recorded RTT between the terminal device with the network-side device, if the change (increase or decrease) in the current obtained or recorded RTT between the terminal device with the network-side device compared to the last obtained or recorded RTT between the terminal device with the network-side device is equal to or less than the first time threshold, then the location information of the terminal device is considered to meet the first preset condition.

The network-side device may include any one of the following: a satellite, a ground reference point, a base station, or a reference point between the satellite and the base station.

That is, if the location information of the terminal device is within a certain range, it can be considered to meet the first preset condition. For example, if the change (increase or decrease) in the distance from the terminal device to a satellite compared to the last obtained or recorded distance from the terminal device to the satellite does not exceed the first distance threshold, then the location information of the terminal device is considered to meet the first preset condition. Or, if the change (increase or decrease) in the distance from the terminal device to a ground reference point compared to the last obtained or recorded distance from the terminal device to the ground reference point is equal to or less than the first distance threshold, then the location information of the terminal device is considered to meet the first preset condition. Or, if the change (increase or decrease) in the distance from the terminal device to a base station compared to the last obtained or recorded distance from the terminal device to the base station is equal to or less than the first distance threshold, then the location information of the terminal device is considered to meet the first preset condition. Or, if the change (increase or decrease) in the distance from the terminal device to a reference point between the satellite and the base station compared to the last obtained or recorded distance from the terminal device to the reference point is equal to or less than the first distance threshold, then the location information of the terminal device is considered to meet the first preset condition.

Similarly, if the change (increase or decrease) in the RTT between the terminal device with a satellite compared to the last obtained or recorded RTT between the terminal device with the satellite is equal to or less than the first time threshold, then the location information of the terminal device is considered to meet the first preset condition. Or, if the change (increase or decrease) in the RTT between the terminal device with a ground reference point compared to the last obtained or recorded RTT between the terminal device with the ground reference point is equal to or less than the first time threshold, then the location information of the terminal device is considered to meet the first preset condition. Or, if the change (increase or decrease) in the RTT between the terminal device and a base station compared to the last obtained or recorded RTT between the terminal device and the base station is equal to or less than the first time threshold, then the location information of the terminal device is considered to meet the first preset condition. Or, if the change (increase or decrease) in the RTT between the terminal device with a reference point between the satellite and the base station compared to the last obtained or recorded RTT between the terminal device with the reference point is equal to or less than the first time threshold, then the location information of the terminal device is considered to meet the first preset condition.

In some embodiments, the terminal device may further periodically or irregularly estimate the TA value and use the difference between the estimated TA value and the currently used TA to determine whether the location change of the terminal device is within a certain range. As an example, the terminal device periodically or irregularly estimates the TA value, and if the terminal device determines that the change (increase or decrease) in the estimated TA value compared to the currently used TA value does not exceed a certain threshold, then the location information of the terminal device is considered to meet the first preset condition.

By implementing the embodiment of this disclosure, the location change factor of the terminal device is considered when determining whether the TA value is valid, which allows the terminal device to use valid TA values for time alignment. This ensures time synchronization with network-side device(s), enabling correct decoding of uplink data and avoiding intra-cell interference.

In some embodiments of this disclosure, the location change factor and the RSRP change information can be combined. That is, the TA value can be considered as valid only when both conditions are met. As an example, for SDT using Configured Grant resource allocation, when the location information of the terminal device meets the first preset condition and the RSRP change information meets the first change condition, the TA value for the SDT is determined to be valid.

The implementation method for determining whether the location information of the terminal device meets the first preset condition is the same as that described in the included embodiments and is not reiterated here.

In this embodiment, the RSRP change information meeting the first change condition may include: the absolute value of the difference between the currently measured RSRP value of the downlink pathloss reference and the stored RSRP value of the downlink pathloss reference is less than the first RSRP threshold value. For example, the RSRP change condition (the aforementioned first change condition) can be that the change (increase/decrease) in the RSRP value of the downlink pathloss reference relative to the stored RSRP value of the downlink pathloss reference is less than a certain threshold (sdt-CG-RSRP-ChangeThreshold-Increase/CG-RSRP-ChangeThresholdDecrease), where sdt-CG-RSRP-ChangeThresholdIncrease can be understood as the threshold for sdt-CG-RSRP increases, and CG-RSRP-ChangeThresholdDecrease can be understood as the threshold for CG-RSRP decreases.

By implementing the embodiment of this disclosure, the location change factor of the terminal device and the RSRP change information are combined to determine whether the TA value is valid, which allows the terminal device to use valid TA values for time alignment. This ensures time synchronization with network-side device(s), enabling correct decoding of uplink data and avoiding intra-cell interference.

Figure 7:
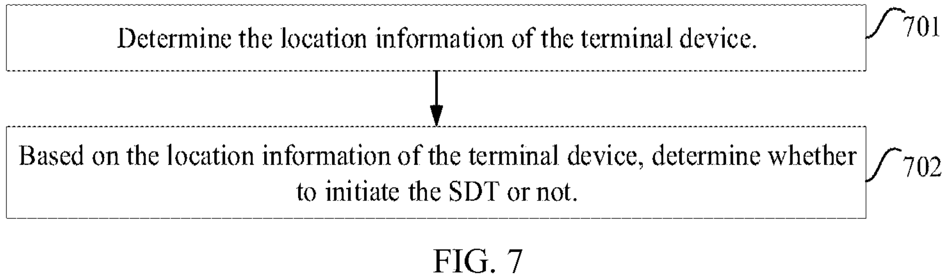
FIG. 7 illustrates a flowchart of a method for SDT processing in a non-terrestrial network according to another embodiment of this disclosure.

FIG. 7 illustrates a flowchart of a method for SDT processing in a non-terrestrial network according to another embodiment of this disclosure. The method for SDT processing in a non-terrestrial network according to this embodiment can be applied to a terminal device. As shown in FIG. 7, the method for SDT processing in a non-terrestrial network can include, but is not limited to, the following steps 701 and 702.

Step 701: Determine the location information of the terminal device.

In the embodiments of this disclosure, step 701 can be implemented using any method described in the various embodiments of this disclosure, which is not reiterated here, and this disclosure does not limit it.

Step 702: Based on the location information of the terminal device, determine whether to initiate the SDT or not.

In some embodiments of this disclosure, it can be determined whether the location information of the terminal device meets the second preset condition. In response to the location information of the terminal device meeting the second preset condition, it initiates the SDT.

In an embodiment, the location information of the terminal device meeting the second preset condition includes at least one of the following: the distance from the terminal device to the network-side device is less than the second distance threshold; the RTT between the terminal device with the network-side device is less than the second time threshold; the increase in the TA value estimated by the terminal device compared to the currently used TA value is equal to or less than the second TA threshold; the decrease in the TA value estimated by the terminal device compared to the currently used TA value is equal to or less than the second TA threshold.

The network-side device may include any one of the following: a satellite, a ground reference point, a base station, or a reference point between the satellite and the base station.

That is, the terminal device can determine whether its location information meets a certain condition through the following way: if the distance from the terminal device to the satellite is less than the second distance threshold, then the location information of the terminal device is considered to meet the second preset condition; or, if the distance from the terminal device to the ground reference point is less than the second distance threshold, then the location information of the terminal device is considered to meet the second preset condition; or, if the distance from the terminal device to the base station is less than the second distance threshold, then the location information of the terminal device is considered to meet the second preset condition; or, if the distance from the terminal device to the reference point between the satellite and the base station is less than the second distance threshold, then the location information of the terminal device is considered to meet the second preset condition.

Similarly, if the RTT between the terminal device with the satellite is less than the second time threshold, then the location information of the terminal device is considered to meet the second preset condition; or, if the RTT between the terminal device with the ground reference point is less than the second time threshold, then the location information of the terminal device is considered to meet the second preset condition; or, if the RTT between the terminal device with the base station is less than the second time threshold, then the location information of the terminal device is considered to meet the second preset condition; or, if the RTT between the terminal device with the reference point between the satellite and the base station is less than the second time threshold, then the location information of the terminal device is considered to meet the second preset condition.

In some embodiments, the terminal device may further periodically or irregularly estimate the TA value and use the difference between the estimated TA value and the currently used TA to determine whether the location of the terminal device meets a certain condition. As an example, the terminal device periodically or irregularly estimates the TA value, and if the terminal device determines that the change (increase or decrease) in the estimated TA value compared to the currently used TA value does not exceed a certain threshold, then the location information of the terminal device is considered to meet the second preset condition.

By implementing the embodiment of this disclosure, whether to initiate the SDT is determined based on the location information of the terminal device, which enables the NTN to support SDT.

In some embodiments of this disclosure, the determination of location information can be combined with RSRP, such that the SDT is initiated only when both the location condition and the RSRP threshold are met. As an example, it determines whether the location information of the terminal device meets the second preset condition; it determines whether the RSRP change information meets the second change condition; in response to the location information of the terminal device meeting the second preset condition and the RSRP change information meeting the second change condition, it initiates the SDT.

The implementation method for determining whether the location information of the terminal device meets the second preset condition is the same as that described in the included embodiments and is not reiterated here.

In this embodiment, the RSRP change information meeting the second change condition may include the currently measured RSRP value of the downlink pathloss reference being greater than the second RSRP threshold value. For example, the change condition for RSRP can be that the RSRP value of the downlink pathloss reference is greater than the threshold value sdt-RSRP-Threshold.

By implementing the embodiment of this disclosure, the location change factor of the terminal device and the RSRP change information are combined to determine whether to initiate the SDT, which enables the near-far effect of signal quality in NTN cells to be covered, avoiding intra-cell interference, and thus enabling the NTN to support SDT.

Figure 8:
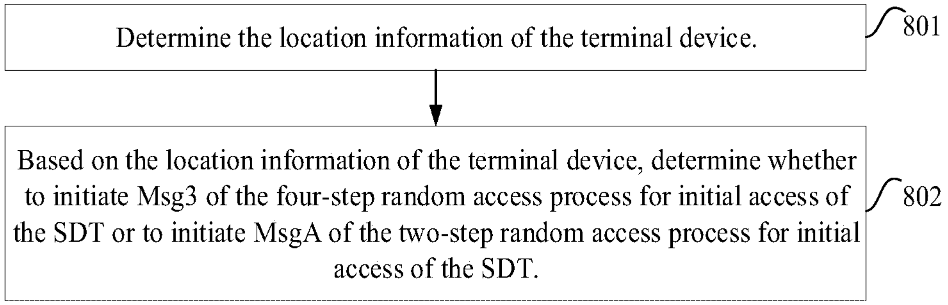
FIG. 8 illustrates a flowchart of a method for SDT processing in a non-terrestrial network according to yet another embodiment of this disclosure.

FIG. 8 illustrates a flowchart of a method for SDT processing in a non-terrestrial network according to another embodiment of this disclosure. The method for SDT processing in a non-terrestrial network according to this embodiment can be applied to a terminal device. As shown in FIG. 8, the method for SDT processing in a non-terrestrial network can include, but is not limited to, the following steps 801 and 802.

Step 801: Determine the location information of the terminal device.

In the embodiment of this disclosure, step 801 can be implemented using any method described in the various embodiments of this disclosure, which is not reiterated here, and this disclosure does not limit it.

Step 802: Based on the location information of the terminal device, determine whether to initiate Msg3 of the four-step random access process for initial access of the SDT or to initiate MsgA of the two-step random access process for initial access of the SDT.

In some embodiments of this disclosure, it can determine whether the location information of the terminal device meets the third preset condition; in response to the location information of the terminal device meeting the third preset condition, it initiates MsgA of the two-step random access process for initial access of the SDT (such as 2-step RA type for SDT); or in response to the location information of the terminal device not meeting the third preset condition, it initiates Msg3 of the four-step random access process for initial access of the SDT (such as 4-step RA type for SDT).

In an embodiment, the location information of the terminal device meeting the third preset condition includes at least one of the following: the distance from the terminal device to the network-side device is less than the third distance threshold; the RTT between the terminal device with the network-side device is less than the third time threshold; the increase in the TA value estimated by the terminal device compared to the currently used TA value is equal to or less than the third TA threshold; the decrease in the TA value estimated by the terminal device compared to the currently used TA value is equal to or less than the third TA threshold.

The network-side device may include any one of the following: a satellite, a ground reference point, a base station, or a reference point between the satellite and the base station.

That is, the terminal device can determine whether its location information meets a certain condition through the following way: if the distance from the terminal device to the satellite is less than the third distance threshold, then the location information of the terminal device is considered to meet the third preset condition; or, if the distance from the terminal device to the ground reference point is less than the third distance threshold, then the location information of the terminal device is considered to meet the third preset condition; or, if the distance from the terminal device to the base station is less than the third distance threshold, then the location information of the terminal device is considered to meet the third preset condition; or, if the distance from the terminal device to the reference point between the satellite and the base station is less than the third distance threshold, then the location information of the terminal device is considered to meet the third preset condition.

Similarly, if the RTT between the terminal device with the satellite is less than the third time threshold, then the location information of the terminal device is considered to meet the third preset condition; or, if the RTT between the terminal device with the ground reference point is less than the third time threshold, then the location information of the terminal device is considered to meet the third preset condition; or, if the RTT between the terminal device with the base station is less than the third time threshold, then the location information of the terminal device is considered to meet the third preset condition; or, if the RTT between the terminal device with the reference point between the satellite and the base station is less than the third time threshold, then the location information of the terminal device is considered to meet the third preset condition.

In some embodiments, the terminal device may further periodically or irregularly estimate the TA value and use the difference between the estimated TA value and the currently used TA to determine whether the location of the terminal device meets a certain condition. As an example, the terminal device periodically or irregularly estimates the TA value, and if the terminal device determines that the change (increase or decrease) in the estimated TA value compared to the currently used TA value does not exceed a certain threshold, then the location information of the terminal device is considered to meet the third preset condition.

By implementing the embodiment of this disclosure, whether to initiate Msg3 of the four-step random access process for initial access of the SDT or to initiate MsgA of the two-step random access process for initial access of the SDT is determined based on the location information of the terminal device, which enables the NTN to support SDT.

In some embodiments of this disclosure, the determination of location information can be combined with RSRP, such that MsgA of the two-step random access process for initial access of the SDT is initiated only when both the location condition and the RSRP threshold are met. As an example, it determines whether the location information of the terminal device meets the third preset condition; it determines whether the RSRP change information meets the third change condition; in response to the location information of the terminal device meeting the third preset condition and the RSRP change information meeting the third change condition, it initiates MsgA of the two-step random access process for initial access of the SDT; in response to the location information of the terminal device not meeting the third preset condition and/or the RSRP change information not meeting the third change condition, it initiates Msg3 of the four-step random access process for initial access of the SDT.

The implementation method for determining whether the location information of the terminal device meets the third preset condition is the same as that described in the included embodiments and is not reiterated here.

In this embodiment, the RSRP change information meeting the third change condition includes the currently measured RSRP value of the downlink pathloss reference being greater than the third RSRP threshold value. For example, the change condition for RSRP can be that the RSRP value of the downlink pathloss reference is greater than the threshold value sdt-MSGA-RSRP-Threshold.

By implementing the embodiment of this disclosure, the location change factor of the terminal device and the RSRP change information are combined to determine whether to initiate Msg3 of the four-step random access process for initial access of the SDT or to initiate MsgA of the two-step random access process for initial access of the SDT, which enables the near-far effect of signal quality in NTN cells to be covered, avoiding intra-cell interference, and thus enabling the NTN to support SDT.

Figure 9:
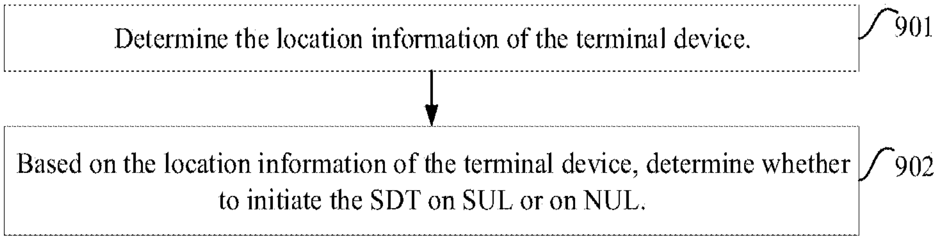
FIG. 9 illustrates a flowchart of a method for SDT processing in a non-terrestrial network according to another embodiment of this disclosure.

FIG. 9 illustrates a flowchart of a method for SDT processing in a non-terrestrial network according to another embodiment of this disclosure. The method for SDT processing in a non-terrestrial network according to this embodiment can be applied to a terminal device. As shown in FIG. 9, the method for SDT processing in a non-terrestrial network can include, but is not limited to, the following steps 901 and 902.

Step 901: Determine the location information of the terminal device.

In the embodiment of this disclosure, step 901 can be implemented using any method described in the various embodiments of this disclosure, which is not reiterated here, and this disclosure does not limit it.

Step 902: Based on the location information of the terminal device, determine whether to initiate the SDT on SUL or NUL.

In some embodiments of this disclosure, it can determine whether the location information of the terminal device meets the fourth preset condition; in response to the location information of the terminal device meeting the fourth preset condition, initiate the SDT on SUL; in response to the location information of the terminal device not meeting the fourth preset condition, it initiates the SDT on NUL.

That is, when determining whether to initiate the SDT on SUL or NUL, the location information of the terminal device should be considered.

In an embodiment, the location information of the terminal device meeting the fourth preset condition includes at least one of the following: the distance from the terminal device to the network-side device is greater than the fourth distance threshold; the RTT between the terminal device with the network-side device is greater than the fourth time threshold; the increase in the TA value estimated by the terminal device compared to the currently used TA value is equal to or greater than the fourth TA threshold; the decrease in the TA value estimated by the terminal device compared to the currently used TA value is equal to or greater than the fourth TA threshold.

That is, the terminal device can determined whether its location information meets a certain condition through the following way: if the distance from the terminal device to the satellite is greater than the fourth distance threshold, then the location information of the terminal device is considered to meet the fourth preset condition; or, if the distance from the terminal device to the ground reference point is greater than the fourth distance threshold, then the location information of the terminal device is considered to meet the fourth preset condition; or, if the distance from the terminal device to the base station is greater than the fourth distance threshold, then the location information of the terminal device is considered to meet the fourth preset condition; or, if the distance from the terminal device to the reference point between the satellite and the base station is greater than the fourth distance threshold, then the location information of the terminal device is considered to meet the fourth preset condition.

Similarly, if the RTT between the terminal device with the satellite is greater than the fourth time threshold, then the location information of the terminal device is considered to meet the fourth preset condition; or, if the RTT between the terminal device with the ground reference point is greater than the fourth time threshold, then the location information of the terminal device is considered to meet the fourth preset condition; or, if the RTT between the terminal device with the base station is greater than the fourth time threshold, then the location information of the terminal device is considered to meet the fourth preset condition; or, if the RTT between the terminal device with the reference point between the satellite and the base station is greater than the fourth time threshold, then the location information of the terminal device is considered to meet the fourth preset condition.

In some embodiments, the terminal device may further periodically or irregularly estimate the TA value and use the difference between the estimated TA value and the currently used TA to determine whether the location of the terminal device meets a certain condition. As an example, the terminal device periodically or irregularly estimates the TA value, and if the terminal device determines that the change (increase or decrease) in the estimated TA value compared to the currently used TA value exceeds a certain threshold, then the location information of the terminal device is considered to meet the fourth preset condition.

By implementing the embodiment of this disclosure, whether to initiate the SDT on SUL or on NUL is determined based on the location information of the terminal device, i.e., the location information of the terminal device is considered when determining whether to initiate the SDT on SUL or on NUL, which enables the NTN to support SDT.

In some embodiments of this disclosure, the determination of location information can be combined with RSRP, and the SDT is initiated on NUL only when corresponding conditions are met, otherwise initiating the SDT on SUL. As an example, it determines whether the location information of the terminal device meets the fifth preset condition; it determines whether the RSRP change information meets the fourth change condition; in response to the location information of the terminal device meeting the fifth preset condition and the RSRP change information meeting the fourth change condition, it initiates the SDT on NUL; in response to the location information of the terminal device not meeting the fifth preset condition, and/or the RSRP change information not meeting the fourth change condition, it initiates the SDT on SUL.

In an embodiment, the location information of the terminal device meeting the fifth preset condition includes at least one of the following: the distance from the terminal device to the network-side device is less than the fifth distance threshold; the RTT between the terminal device and the network-side device is less than the fifth time threshold. The network-side device may include any one of the following: a satellite, a ground reference point, a base station, or a reference point between the satellite and the base station.

That is, the terminal device can determine whether its location information meets a certain condition through the following way: if the distance from the terminal device to the satellite is less than the fifth distance threshold, then the location information of the terminal device is considered to meet the fifth preset condition; or, if the distance from the terminal device to the ground reference point is less than the fifth distance threshold, then the location information of the terminal device is considered to meet the fifth preset condition; or, if the distance from the terminal device to the base station is less than the fifth distance threshold, then the location information of the terminal device is considered to meet the fifth preset condition; or, if the distance from the terminal device to the reference point between the satellite and the base station is less than the fifth distance threshold, then the location information of the terminal device is considered to meet the fifth preset condition.

Similarly, if the RTT between the terminal device with the satellite is less than the fifth time threshold, then the location information of the terminal device is considered to meet the fifth preset condition; or, if the RTT between the terminal device with the ground reference point is less than the fifth time threshold, then the location information of the terminal device is considered to meet the fifth preset condition; or, if the RTT between the terminal device with the base station is less than the fifth time threshold, then the location information of the terminal device is considered to meet the fifth preset condition; or, if the RTT between the terminal device with the reference point between the satellite and the base station is less than the fifth time threshold, then the location information of the terminal device is considered to meet the fifth preset condition.

In an embodiment, the RSRP change information meeting the fourth change condition includes the currently measured RSRP value of the downlink pathloss reference being greater than the fourth RSRP threshold value.

That is, the determination of location information can be combined with RSRP, such that the SDT is initiated on NUL only when the distance is less than a certain threshold, and the RSRP is greater than a certain threshold; otherwise, initiate the SDT on SUL. Or, the SDT is initiated on NUL only when the RTT is less than a certain threshold and the RSRP is greater than a certain threshold, otherwise initiating the SDT on SUL.

By implementing the embodiment of this disclosure, the location change factor of the terminal device and the RSRP change information are combined to determine whether to initiate the SDT on SUL or on NUL, i.e., both the location change factor and the RSRP change information are considered when determining to initiate the SDT on SUL or on NUL, which enables the near-far effect of signal quality in NTN cells to be covered, avoiding intra-cell interference, and thus enabling the NTN to support SDT.

In another embodiment of this disclosure, the determination of location information can be combined with RSRP, such that the SDT is initiated on NUL only when both conditions are met, otherwise initiating the SDT on SUL. As an example, it determines whether the location information of the terminal device meets the sixth preset condition, and determines whether the RSRP change information meets the fifth change condition; in response to the location information of the terminal device meeting the sixth preset condition and the RSRP change information meeting the fifth change condition, it initiates the SDT on SUL; in response to the location information of the terminal device not meeting the sixth preset condition, and/or the RSRP change information not meeting the fifth change condition, it initiates the SDT on NUL.

In an embodiment, the location information of the terminal device meeting the sixth preset condition includes at least one of the following: the distance from the terminal device to the network-side device is greater than the sixth distance threshold; the RTT between the terminal device and the network-side device is greater than the sixth time threshold. The network-side device may include any one of the following: a satellite, a ground reference point, a base station, or a reference point between the satellite and the base station.

That is, the terminal device can determine whether its location information meets a certain condition through the following way: if the distance from the terminal device to the satellite is greater than the sixth distance threshold, then the location information of the terminal device is considered to meet the sixth preset condition; or, if the distance from the terminal device to the ground reference point is greater than the sixth distance threshold, then the location information of the terminal device is considered to meet the sixth preset condition; or, if the distance from the terminal device to the base station is greater than the sixth distance threshold, then the location information of the terminal device is considered to meet the sixth preset condition; or, if the distance from the terminal device to the reference point between the satellite and the base station is greater than the sixth distance threshold, then the location information of the terminal device is considered to meet the sixth preset condition.

Similarly, if the RTT between the terminal device with the satellite is greater than the sixth time threshold, then the location information of the terminal device is considered to meet the sixth preset condition; or, if the RTT between the terminal device with the ground reference point is greater than the sixth time threshold, then the location information of the terminal device is considered to meet the sixth preset condition; or, if the RTT between the terminal device with the base station is greater than the sixth time threshold, then the location information of the terminal device is considered to meet the sixth preset condition; or, if the RTT between the terminal device with the reference point between the satellite and the base station is greater than the sixth time threshold, then the location information of the terminal device is considered to meet the sixth preset condition.

In an embodiment, the RSRP change information meeting the fifth change condition includes the currently measured RSRP value of the downlink pathloss reference being less than the fifth RSRP threshold value. That is, the determination of location information can be combined with RSRP, such that the SDT is initiated on SUL only when the distance is greater than a certain threshold, and the RSRP is less than a certain threshold; otherwise, it initiates the SDT on NUL. Or, the SDT is initiated on SUL only when the RTT is greater than a certain threshold, and the RSRP is less than a certain threshold, otherwise initiating the SDT on NUL. As an example, the fifth change condition for RSRP can be that the RSRP value of the downlink pathloss reference is less than the threshold value sdt-RSRP-ThresholdSSB-SUL.

By implementing the embodiment of this disclosure, the location change factor of the terminal device and the RSRP change information are combined to determine whether to initiate the SDT on SUL or on NUL, i.e., both the location change factor and the RSRP change information are considered when determining whether to initiate the SDT on SUL or on NUL, which enables the near-far effect of signal quality in NTN cells to be covered, avoiding intra-cell interference, and thus enabling the NTN to support SDT.

Figure 10:
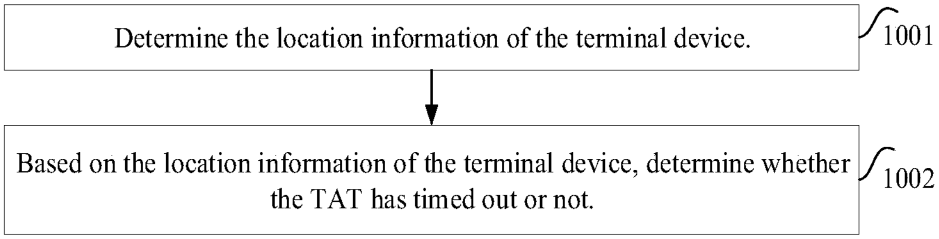
FIG. 10 illustrates a flowchart of a method for SDT processing in a non-terrestrial network according to another embodiment of this disclosure.

FIG. 10 illustrates a flowchart of a method for SDT processing in a non-terrestrial network according to another embodiment of this disclosure. The method for SDT processing in a non-terrestrial network according to this embodiment can be applied to a terminal device. As shown in FIG. 10, the method for SDT processing in a non-terrestrial network can include, but is not limited to, the following steps 1001 and 1002.

Step 1001: Determine the location information of the terminal device.

In the embodiments of this disclosure, step 1001 can be implemented using any method described in the various embodiments of this disclosure, which is not reiterated here, and this disclosure does not limit it.

Step 1002: Based on the location information of the terminal device, determine whether the TAT has timed out or not.

In some embodiments of this disclosure, it is possible to determine whether the location information of the terminal device meets the seventh preset condition, and in response to the location information of the terminal device meeting this seventh preset condition, determines that the TAT has timed out. As an example, the TAT may include timeAlignmentTimer or cg-SDT-TimeAlignmentTimer.

That is, determining whether the TAT has timed out can take the location information of the terminal device into account.

In an embodiment, the location information of the terminal device meeting the seventh preset condition includes at least one of the following: the distance from the terminal device to the network-side device is greater than the seventh distance threshold; the RTT between the terminal device with the network-side device is greater than the seventh time threshold; the increase in the TA value estimated by the terminal device compared to the currently used TA value is equal to or greater than the fifth TA threshold; the decrease in the TA value estimated by the terminal device compared to the currently used TA value is equal to or greater than the fifth TA threshold.

That is, the terminal device can determine whether its location information meets a certain condition through the following way: if the distance from the terminal device to the satellite is greater than the seventh distance threshold, then the location information of the terminal device is considered to meet the seventh preset condition; or, if the distance from the terminal device to the ground reference point is greater than the seventh distance threshold, then the location information of the terminal device is considered to meet the seventh preset condition; or, if the distance from the terminal device to the base station is greater than the seventh distance threshold, then the location information of the terminal device is considered to meet the seventh preset condition; or, if the distance from the terminal device to the reference point between the satellite and the base station is greater than the seventh distance threshold, then the location information of the terminal device is considered to meet the seventh preset condition.

Similarly, if the RTT between the terminal device with the satellite is greater than the seventh time threshold, then the location information of the terminal device is considered to meet the seventh preset condition; or, if the RTT between the terminal device with the ground reference point is greater than the seventh time threshold, then the location information of the terminal device is considered to meet the seventh preset condition; or, if the RTT between the terminal device with the base station is greater than the seventh time threshold, then the location information of the terminal device is considered to meet the seventh preset condition; or, if the RTT between the terminal device with the reference point between the satellite and the base station is greater than the seventh time threshold, then the location information of the terminal device is considered to meet the seventh preset condition.

In some embodiments, the terminal device may further periodically or irregularly estimate the TA value and use the difference between the estimated TA value and the currently used TA to determine whether the location of the terminal device meets a certain condition. As an example, the terminal device periodically or irregularly estimates the TA value, and if the terminal device determines that the change (increase or decrease) in the estimated TA value compared to the currently used TA value exceeds a certain threshold, then the location information of the terminal device is considered to meet the seventh preset condition.

By implementing the embodiment of this disclosure, determining whether the TAT has timed out based on the location information of the terminal device, i.e., the location information of the terminal device is considered when determining whether the TAT has timed out, which enables the terminal device to handle abnormal process of the link when the TAT is determined to have timed out, thereby perfecting the communication process of the NTN system and ensuring the normal operation of NTN system communications, enabling the NTN to support SDT.

It can be understood that, as shown in FIG. 4B, for CG-SDT resources configured by the network, after the UE transmits data using the CG resource, a feedback timer (e.g., feedbackTimer) starts timing for the UE to listen for feedback from the network side. If the UE does not receive a successful reception confirmation from the network side during the feedback timer timing, the UE retransmits data using subsequent CG resources. Due to the relatively long RTT of the NTN and some timers configured for SDT needing to consider feedback delay, it is necessary to enhance the timers. In some embodiments of this disclosure, the terminal device can further enhance the timer, which starts timing after the terminal device initiates transmission on CG SDT.

In one optional embodiment, the enhancement on the timer can be achieved by offsetting the stat time of the timer by one RTT between the terminal device and the base station or increasing the timing value of the timer by one RTT between the terminal device and the base station.

Optionally, the timer can be any one of the following: the SDT Configured Grant Timer; the SDT Configured Grant Retransmission Timer; a first preset timer, where the terminal device is allowed to initiates retransmission automatically after the first preset timer has timed out, that is, the terminal device is not allowed to initiate uplink retransmission automatically until the first preset timer has timed out; or a second preset timer, where the terminal device waits for feedback from the base station during the second preset timer timing. Optionally, the first and/or second preset timer can be configured for CG SDT.

For example, an SDT Configured Grant Timer (e.g., SDT-configuredGrantTimer) starts timing after the terminal device initiates transmission on CG SDT. Where the start time of this timer is offset by one RTT between the terminal device and the base station, or the timing value of the timer is increased by one RTT between the terminal device and the base station.

Similarly, an SDT Configured Grant Retransmission Timer (e.g., cg-SDT-RetransmissionTimer) starts timing after the terminal device initiates transmission on CG SDT. Where the start time of this timer is offset by one RTT between the terminal device and the base station, or the starting value of the timer is increased by one RTT between the terminal device and the base station.

Furthermore, a timer starts timing after the terminal device initiates transmission on CG SDT, and the terminal device is allowed to initiate retransmission automatically after the timer has timed out. That is, the terminal device is not allowed to initiate uplink retransmission automatically until the timer has timed out. Where the start time of the timer is offset by one RTT between the terminal device and the base station, or the timing value of the timer is increased by one RTT between the terminal device and the base station. Alternatively, a timer starts timing after the terminal device initiates transmission on CG SDT, and the terminal device waits for feedback from the base station (e.g., uplink/downlink scheduling, or ACK/NACK feedback) during the timer timing. Where the start time of the timer is offset by one RTT between the terminal device and the base station, or the timing value of the timer is increased by one RTT between the terminal device and the base station. The timer may be for CG SDT.

By implementing the embodiment of this disclosure, the timer which starts timing after transmission is initiated on CG SDT is enhanced, such as the start time of the timer being offset by one RTT between the terminal device with the base station or the timing value of the timer being increased by one RTT, which ensures that the timer is adapted to the NTN, thereby perfecting the communication process of the NTN system and ensuring normal operation of NTN system communications, enabling the NTN to support SDT.

Figure 11:
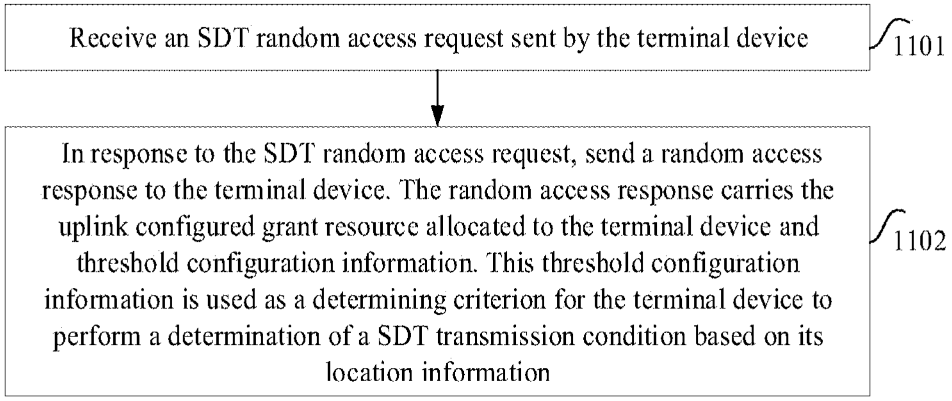
FIG. 11 illustrates a flowchart of a method for SDT processing in a non-terrestrial network according to another embodiment of this disclosure.

It can be understood that the embodiments herein describe the implementation method for SDT processing in the NTN from the perspective of the terminal device. This disclosure further proposes a method for SDT processing in the NTN, which will be described from the perspective of the network-side device. Refer to FIG. 11, which illustrates a flowchart for a method of SDT processing in a non-terrestrial network according to another embodiment of this disclosure. It should be noted that this method for SDT processing in a non-terrestrial network can be applied to a network-side device. As shown in FIG. 11, this method can include, but is not limited to, the following steps 1101 and 1102.

Step 1101: Receive an SDT random access request sent by the terminal device. This SDT random access request carries an SDT indication, which is configured to inform the network-side device that wireless access signaling will be used to carry small data packets.

Step 1102: In response to the SDT random access request, send a random access response to the terminal device. This random access response carries the uplink configured grant resource allocated to the terminal device and threshold configuration information. This threshold configuration information is used as a determining criterion for the terminal device to perform a determination of an SDT transmission condition based on its location information.

For example, the terminal device registers to the network and establishes a safe connection with the network-side device. The terminal device initiates a random access request, which carries a terminal identifier and an SDT indication. In this embodiment, the SDT indication can be a wireless connection indication or an SDT indication. This indication is to inform the network-side device that the terminal device will use wireless access signaling to carry small data packets. The wireless access network returns a random access response, which carries the terminal identifier and the uplink grant resource allocated to the terminal device. The terminal device sends a random access ACK, which carries the uplink small data packet. Optionally, this small data packet can be an encrypted Non-Access Stratum (NAS) data packet. The wireless access network selects an appropriate core network for the terminal device based on the terminal identifier and sends an initializing UE context message, which carries the terminal identifier and the encrypted data packet. The core network verifies the message and decrypts the data packet. The core network sends the small data packet to the PDN Gateway (PGW) and temporarily stores the wireless access network identifier that forwarded the small data packet transmitted from the terminal.

In this embodiment, when the network-side device returns the random access response to the terminal device, the response carries the uplink configured grant resource allocated to the terminal device and threshold configuration information. This threshold configuration information is used as criteria for the terminal device to perform a determination of an SDT transmission condition based on the location information of the terminal device. In an embodiment, this threshold configuration information may include: distance thresholds (e.g., the first distance threshold), time thresholds (e.g., the first time threshold), the first TA threshold (used as a determining criterion for determining whether the location information meets the first preset condition based on the estimated TA value and the currently used TA value) for determining whether the TA value is valid based on the location information, and the first RSRP threshold value (used as a criterion for determining whether the RSRP change information meets the first change condition when the location information and the RSRP are combined to determine whether the TA value is valid).

Optionally, the threshold configuration information may also include: distance thresholds (e.g., the second distance threshold), time thresholds (e.g., the second time threshold), the second TA threshold (used as a determining criterion for determining whether the location information meets the second preset condition based on the estimated TA value and the currently used TA value) for determining whether to initiate the SDT based on the location information, and the second RSRP threshold value (used as a criterion for determining whether the RSRP change information meets the second change condition when the location information and the RSRP are combined to determine whether to initiate the SDT).

Optionally, the threshold configuration information may also include: distance thresholds (e.g., the third distance threshold), time thresholds (e.g., the third time threshold), the third TA threshold (used as a determining criterion for determining whether the location information meets the third preset condition based on the estimated TA value and the currently used TA value) for determining whether to initiate Msg3 of the four-step random access process for initial access of the SDT or to initiate MsgA of the two-step random access process for initial access of the SDT based on the location information, and the third RSRP threshold value (used as a criterion for determining whether the RSRP change information meets the third change condition when the location information and the RSRP are combined to determine whether to initiate Msg3 of the four-step random access process for initial access of the SDT or to initiate MsgA of the two-step random access process for initial access of the SDT).

Optionally, the threshold configuration information may also include: distance thresholds (e.g., the fourth, fifth, or sixth distance thresholds), time thresholds (e.g., the fourth, fifth, or sixth time thresholds), the fourth TA threshold (used as a determining criterion for determining whether the location information meets the fourth preset condition based on the estimated TA value and the currently used TA value), the fifth TA threshold (used as a determining criterion for determining whether the location information meets the fifth preset condition based on the estimated TA value and the currently used TA value) for determining whether to initiate the SDT on the SUL or on the NUL, and the fourth RSRP threshold value (used as a criterion for determining whether the RSRP change information meets the fourth change condition when the location information and the RSRP are combined to determine whether to initiate the SDT on the SUL or on the NUL), and the fifth RSRP threshold value (used as a criterion for determining whether the RSRP change information meets the fifth change condition when the location information and the RSRP are combined to determine whether to initiate the SDT on the SUL or on the NUL).

Optionally, the threshold configuration information may also include: distance thresholds (e.g., the seventh distance threshold), time thresholds (e.g., the seventh time threshold), the fifth TA threshold (used as a criterion for determining whether the location information meets the seventh preset condition based on the estimated TA value and the currently used TA value) for determining whether the TAT has timed out based on location information.

By implementing the embodiments of this disclosure, the location information is considered when applying SDT technology in the NTN, which enables the NTN to support SDT.

In the embodiments of this disclosure provided herein, the methods are introduced from the perspectives of both the terminal device and the network-side device. To realize the various functions in the methods according to these embodiments, both the terminal device and the network-side device can include hardware structures, software modules, or a combination of both, to implement the aforementioned functions. Any of these functions can be executed through hardware structures, software modules, or a combination of the two.

Figure 12:
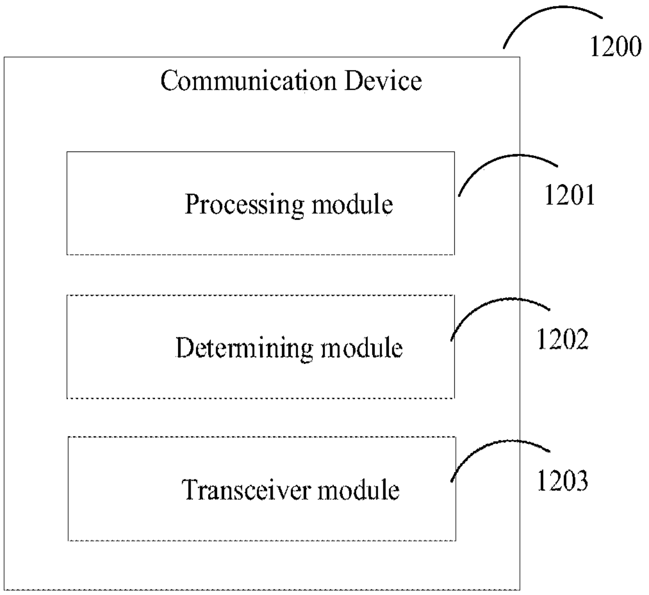
FIG. 12 illustrates the structure of a communication device schematically according to an embodiment of this disclosure.

Refer to FIG. 12, which schematically illustrates the structure of a communication device 1200 according to an embodiment of the disclosure. As shown in FIG. 12, the communication device 1200 can include a processing module 1201. The processing module 1201 can be a processor.

The communication device 1200 can be a terminal device, a device within the terminal device, or a device used in conjunction with the terminal device. Alternatively, the communication device 1200 can be a network-side device, a device within the network-side device, or a device that can be used in conjunction with the network-side device.

In an embodiment of this disclosure, the communication device 1200 is a terminal device including a processing module 1201 and a determining module 1202. In this embodiment, the processing module 1201 is configured to determine the location information of the terminal device. The determining module 1202 is configured to perform a determination of an SDT transmission condition based on the location information of the terminal device.

In an embodiment, the determining module 1202 is specifically configured to: determine whether the TA value for the SDT is valid based on the location information of the terminal device.

In an optional embodiment, the determining module 1202 is specifically configured to, for an SDT using configured grant resource allocation, when the location information of the terminal device meets the first preset condition, determine that the TA value for the SDT is valid.

In another optional embodiment, the determining module 1202 is specifically configured to, for an SDT using configured grant resource allocation, when the location information of the terminal device meets the first preset condition and the RSRP change information meets the first change condition, determine that the TA value for the SDT is valid.

Optionally, the location information of the terminal device meeting the first preset condition includes at least one of the following: the increase in a distance from the terminal device to the network-side device compared to the last obtained or recorded distance from the terminal device to the network-side device is equal to or less than the first distance threshold; the decrease in the distance from the terminal device to the network-side device compared to the last obtained or recorded distance from the terminal device to the network-side device is equal to or less than the first distance threshold; the increase in the RTT between the terminal device with the network-side device compared to the last obtained or recorded RTT between the terminal device with the network-side device is equal to or less than the first time threshold; the decrease in the RTT between the terminal device with the network-side device compared to the last obtained or recorded RTT between the terminal device with the network-side device is equal to or less than the first time threshold; the increase in the TA value estimated by the terminal device compared to the currently used TA value is equal to or less than the first TA threshold; or the decrease in the TA value estimated by the terminal device compared to the currently used TA value is equal to or less than the first TA threshold.

Where the RSRP change information meeting the first change condition includes: the absolute value of the difference between the currently measured RSRP value of the downlink pathloss reference and the stored RSRP value of the downlink pathloss reference being less than the first RSRP threshold value.

In an embodiment, the determining module 1202 is specifically configured to determine whether to initiate the SDT based on the location information of the terminal device.

In some embodiments of this disclosure, the determining module 1202 is specifically configured to determine whether the location information of the terminal device meets the second preset condition and in response to the location information of the terminal device meeting the second preset condition, initiate the SDT.

In other embodiments of this disclosure, the determining module 1202 specifically configured to: determine whether the location information of the terminal device meets the second preset condition, determine whether the RSRP change information meets the second change condition, and in response to the location information of the terminal device meeting the second preset condition and the RSRP change information meeting the second change condition, initiate the SDT.

In an embodiment, the location information of the terminal device meeting the second preset condition includes at least one of the following: the distance from the terminal device to the network-side device is less than the second distance threshold; the RTT between the terminal device with the network-side device is less than the second time threshold; the increase in the TA value estimated by the terminal device compared to the currently used TA value is equal to or less than the second TA threshold; or the decrease in the TA value estimated by the terminal device compared to the currently used TA value is equal to or less than the second TA threshold.

Optionally, the RSRP change information meeting the second change condition includes: the currently measured RSRP value of the downlink pathloss reference being greater than the second RSRP threshold value.

In an embodiment, the determining module 1202 is specifically configured to: based on the location information of the terminal device, determine whether to initiate Msg3 of the four-step random access process for initial access of the SDT or initiate MsgA of the two-step random access process for initial access of the SDT.

In some embodiments of this disclosure, the determining module 1202 specifically configured to: determine whether the location information of the terminal device meets the third preset condition; in response to the location information of the terminal device meeting the third preset condition, initiate MsgA of the two-step random access process for initial access of the SDT; in response to the location information of the terminal device not meeting the third preset condition, initiate Msg3 the four-step random access process for initial access of the SDT.

In other embodiments of this disclosure, the determining module 1202 specifically configured to: determine whether the location information of the terminal device meets the third preset condition; determine whether the RSRP change information meets the third change condition; in response to the location information of the terminal device meeting the third preset condition and the RSRP change information meeting the third change condition, initiate MsgA of the two-step random access process for initial access of the SDT; in response to the location information of the terminal device not meeting the third preset condition, and/or the RSRP change information not meeting the third change condition, initiate Msg3 of the four-step random access process for initial access of the SDT.

In an embodiment, the location information of the terminal device meeting the third preset condition includes at least one of the following: the distance from the terminal device to the network-side device is less than the third distance threshold; the RTT between the terminal device with the network-side device is less than the third time threshold; the increase in the TA value estimated by the terminal device compared to the currently used TA value is equal to or less than the third TA threshold; or the decrease in the TA value estimated by the terminal device compared to the currently used TA value is equal to or less than the third TA threshold.

In an embodiment, the RSRP change information meeting the third change condition includes: the currently measured RSRP value of the downlink pathloss reference is greater than the third RSRP threshold value.

In an embodiment, the determining module 1202 is specifically configured to: based on the location information of the terminal device, determine whether to initiate the SDT on SUL or on NUL.

In some embodiments of this disclosure, the determining module 1202 specifically configured to: determine whether the location information of the terminal device meets the fourth preset condition; in response to the location information of the terminal device meeting the fourth preset condition, initiate the SDT on SUL; in response to the location information of the terminal device not meeting the fourth preset condition, initiate the SDT on NUL.

In an embodiment, the location information of the terminal device meeting the fourth preset condition includes at least one of the following: the distance from the terminal device to the network-side device is greater than the fourth distance threshold; the RTT between the terminal device with the network-side device is greater than the fourth time threshold; the increase in the TA value estimated by the terminal device compared to the currently used TA value is equal to or greater than the fourth TA threshold; or the decrease in the TA value estimated by the terminal device compared to the currently used TA value is equal to or greater than the fourth TA threshold.

In another embodiment of this disclosure, the determining module 1202 specifically configured to: determine whether the location information of the terminal device meets the fifth preset condition; determine whether the RSRP change information meets the fourth change condition; in response to the location information of the terminal device meeting the fifth preset condition and the RSRP change information meeting the fourth change condition, initiate the SDT on NUL; in response to the location information of the terminal device not meeting the fifth preset condition, and/or the RSRP change information not meeting the fourth change condition, initiate the SDT on SUL.

Where the location information of the terminal device meeting the fifth preset condition includes at least one of the following: the distance from the terminal device to the network-side device is less than the fifth distance threshold; the RTT between the terminal device and the network-side device is less than the fifth time threshold.

Optionally, the RSRP change information meeting the fourth change condition includes the currently measured RSRP value of the downlink pathloss reference is greater than the fourth RSRP threshold value.

In some embodiments of this disclosure, the determining module 1202 specifically configured to: determine whether the location information of the terminal device meets the sixth preset condition; determine whether the RSRP change information meets the fifth change condition; in response to the location information of the terminal device meeting the sixth preset condition and the RSRP change information meeting the fifth change condition, initiate the SDT on SUL; in response to the location information of the terminal device not meeting the sixth preset condition, and/or the RSRP change information not meeting the fifth change condition, initiate the SDT on NUL.

Where the location information of the terminal device meeting the sixth preset condition includes at least one of the following: the distance from the terminal device to the network-side device is greater than the sixth distance threshold; the RTT between the terminal device and the network-side device is greater than the sixth time threshold.

Optionally, the RSRP change information meeting the fifth change condition includes: the currently measured RSRP value of the downlink pathloss reference is less than the fifth RSRP threshold value.

In an embodiment, the determining module 1202 is specifically configured to: based on the location information of the terminal device, determine whether the TAT has timed out.

In some embodiments of this disclosure, the determining module 1202 is specifically configured to determine whether the location information of the terminal device meets the seventh preset condition, and in response to the location information of the terminal device meeting the seventh preset condition, determine that the TAT has timed out.

In an embodiment, the location information of the terminal device meeting the seventh preset condition includes at least one of the following: the distance from the terminal device to the network-side device is greater than the seventh distance threshold; the RTT between the terminal device with the network-side device is greater than the seventh time threshold; the increase in the TA value estimated by the terminal device compared to the currently used TA value is equal to or greater than the fifth TA threshold; or the decrease in the TA value estimated by the terminal device compared to the currently used TA value is equal to or greater than the fifth TA threshold.

In some embodiments of this disclosure, the determining module 1202 is also configured to: in a case a timer starts timing after transmission is initiated on CG SDT, perform an enhanced process on the timer.

In an embodiment, the determining module 1202 is specifically configured to: offset the start time of the timer by one RTT between the terminal device and the base station; or increase the timing value of the timer by one RTT between the terminal device and the base station.

In optional embodiments, the timer is any one of the following: a configured grant timer for the SDT; a configured grant retransmission timer for the SDT; a first preset timer, where the terminal device is allowed to initiate retransmission automatically after the first preset timer has timed out, that is, the terminal device is not allowed to initiate retransmission automatically until the first preset timer has timed out; or a second preset timer, where the terminal device waits for feedback from the base station during the second preset timer timing.

Optionally, the first preset timer and/or the second preset timer are for CG SDT.

In one optional embodiment, the aforementioned network-side device includes any of the following: a satellite, a ground reference point, a base station, a reference point between the satellite and the base station.

In an embodiment of this disclosure, the communication device 1200 is a network-side device including a transceiver module 1203. In this embodiment, the transceiver module 1203 is configured to receive the SDT random access request sent by the terminal device, which carries an SDT indication to inform the network-side device that wireless access signaling will be used to carry small data packets. The transceiver module 1203 is also configured to: in response to the SDT random access request, send a random access response to the terminal device, which carries the uplink configured grant resources allocated to the terminal device and threshold configuration information, the threshold configuration information is used as determination criteria for the terminal device to perform a determination of an SDT transmission condition based on the location information of the terminal device.

Regarding the devices in the aforementioned embodiments, the specific ways in which each module performs operations have been described in detail in the embodiments related to the methods, and will not be elaborated here.

Figure 13:
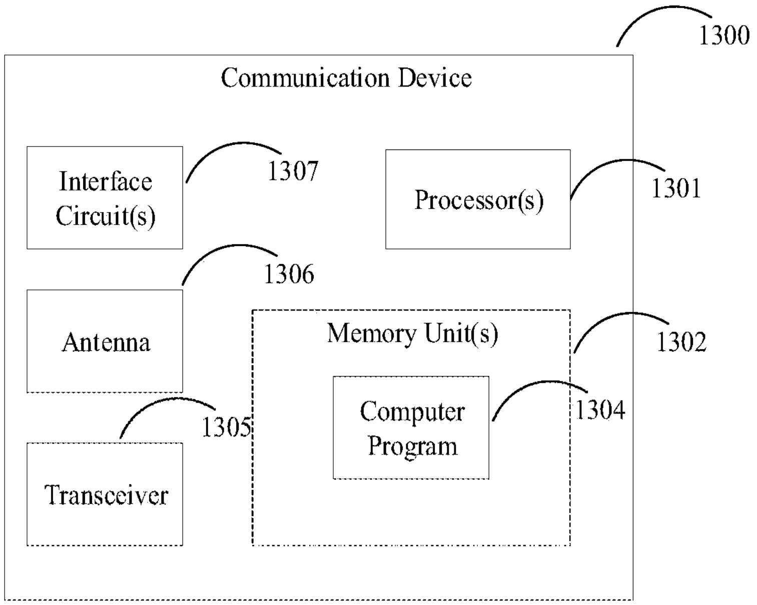
FIG. 13 illustrates the structure of a communication device schematically according to another embodiment of this disclosure.

Referring to FIG. 13, FIG. 13 illustrates the structure of a communication device 1300 schematically according to an embodiment of this disclosure. The communication device 1300 can be a terminal device or a network-side device, can be a chip, a chip system, or a processor that supports the terminal device to implement the aforementioned methods, or can be a chip, a chip system, or a processor that supports the network-side device to implement the aforementioned methods. The communication device 1300 can be configured to implement the methods described in the method embodiments herein, and specific descriptions can be found in the method embodiments herein.

The communication device 1300 may include one or more processors 1301. The processor 1301 can be a general-purpose processor or a specialized processor, etc. For example, it can be a baseband processor or a central processor. The baseband processor can be configured to process communication protocols and communication data, while the central processor can control the communication device (e.g., base station, baseband chip, terminal device, terminal device chip, DU or CU, etc.), execute computer programs, and process data from computer programs.

Optionally, the communication device 1300 may include one or more memory units 1302 that store computer programs 1304. The processor 1301 executes these computer programs 1304, enabling the communication device 1300 to perform the methods described in the method embodiments herein. The memory unit 1302 may also store data. The communication device 1300 and the memory unit 1302 may be set up separately (not shown) or integrated together.

Optionally, the communication device 1300 may also include a transceiver 1305 and an antenna 1306. The transceiver 1305, also known as a transceiver unit, transceiver machine, or transceiver circuit, etc., is configured to implement transmission and reception functions. The transceiver 1305 may include a receiver and a transmitter, where the receiver is configured to implement reception functions and the transmitter is configured to implement transmission functions.

Optionally, the communication device 1300 may also include one or more interface circuits 1307. The interface circuit 1307 is configured to receive code instructions and transmit them to the processor 1301. The processor 1301 runs these code instructions to enable the communication device 1300 to implement the methods described herein in the method embodiments.

In embodiments where the communication device 1300 is a terminal device, the transceiver 1305 is configured to perform steps 501 and 502 in FIG. 5; steps 601 and 602 in FIG. 6; steps 1301 and 1302 in FIG. 13; steps 801 and 802 in FIG. 8; steps 901 and 902 in FIG. 9; steps 1001 and 1002 in FIG. 10; the step "in a case a timer starts timing after transmission is initiated on CG SDT, performing enhanced process on the time"; the step "offsetting the start time of the timer by one RTT between the terminal device with the base station; or increasing the timing value of the timer by one RTT between the terminal device with the base station."

In embodiments where the communication device 1300 is a network-side device, the transceiver 1305 is configured to perform steps 1101 and 1102 in FIG. 11.

In an embodiment, the processor 1301 may include a transceiver for implementing transmission and reception functions. For example, this transceiver can be a transceiver circuit, an interface, or an interface circuit. The transceiver circuit, interface, or interface circuit used for transmission and reception functions can be separate or integrated together. The aforementioned transceiver circuit, interface, or interface circuit can be used for reading and writing code/data, or for transmitting or transferring signals.

In an embodiment, the memory unit 1302 may store computer programs 1304, which run on the processor 1301 and enable the communication device 1300 to perform the methods described in the method embodiments herein. The computer programs 1304 may be embedded in the processor 1301, in which case the processor 1301 may be implemented in hardware.

In an embodiment, the communication device 1300 may include circuits that implement the transmission, reception, or communication functions described herein in the method embodiments. The processor and transceiver described in this disclosure may be implemented in integrated circuits (ICs), analog ICs, RF integrated circuits (RFICs), mixed-signal ICs, application-specific integrated circuits (ASICs), printed circuit boards (PCBs), electronic devices, etc. The processor and transceiver may also be manufactured using various IC fabrication technologies, such as complementary metal-oxide-semiconductor (CMOS), n-type metal-oxide-semiconductor (NMOS), positive channel metal-oxide-semiconductor (PMOS), bipolar junction transistor (BJT), BiCMOS, silicon germanium (SiGe), gallium arsenide (GaAs), etc.

The communication devices described in the included embodiments can be terminal devices, but the scope of the communication devices described in this disclosure is not limited to this. Moreover, the structure of the communication devices is not limited to that shown in FIG. 13. The communication device can be an independent device or part of a larger device. For example, the communication device can be any of the following, individually or in combination.

(1) An independent integrated circuit (IC), chip, chip system, or subsystem.

(2) A collection of one or more ICs, optionally including storage components for storing data and computer programs.

(3) An ASIC, such as a modem.

(4) A module embeddable in other devices.

(5) Receivers, terminal devices, smart terminal devices, cellular phones, wireless devices, handheld devices, mobile units, vehicular devices, network devices, cloud devices, artificial intelligence devices, etc.

(6) Others, etc.

Those skilled in the art will also understand that the various illustrative logical blocks and steps listed in the embodiments of this disclosure can be implemented by electronic hardware, computer software, or a combination of both. Whether such functionality is implemented as hardware or software depends on the specific application and design requirements of the overall system. Those skilled in the art can use various methods to implement the described functions for each specific application, but such implementation should not be understood as going beyond the scope of protection of the embodiments of this disclosure.

The present disclosure also provides a communication system, including the communication devices as terminal devices and network-side devices in the embodiments shown in FIG. 12, or the communication devices as terminal devices and network-side devices in the embodiments shown in FIG. 13.

The present disclosure also provides a computer-readable storage medium storing instructions that, when executed by a computer, implement the functionality of any one of the method embodiments described herein.

The present disclosure also provides a computer program product, which, when executed by a computer, implements the functionality of any one of the method embodiments described herein.

In the included embodiments, the entire or partial implementation can be realized through software, hardware, firmware, or any combination thereof. When implemented using software, it can be entirely or partially realized in the form of a computer program product. The computer program product includes one or more computer programs. When the computer program is loaded and executed on a computer, it entirely or partially generates a process or functionality as described in the embodiments of this disclosure. The computer can be a general-purpose computer, a special-purpose computer, a computer network, or other programmable devices. The computer program can be stored in a computer-readable storage medium or transmitted from one computer-readable storage medium to another, for example, the computer program can be transmitted from one website, computer, server, or data center to another website, computer, server, or data center via wired (such as coaxial cable, fiber optic, digital subscriber line (DSL)) or wireless (such as infrared, wireless, microwave, etc.) methods. The computer-readable storage medium can be any available medium that a computer can access, or a data storage device such as a server, data center, etc., that integrates one or more available media. The available media can be magnetic media (such as floppy disks, hard disks, magnetic tapes), optical media (such as digital video discs (DVDs)), or semiconductor media (such as solid-state disks (SSDs)), etc.

Those skilled in the art can understand: in this disclosure, the various numerical denominations such as "first," "second," and so forth are for the convenience of description and are not intended to limit the scope of the embodiments of this disclosure, nor do they imply a sequence.

At least one of the present disclosures can be described as one or more, with multiple being two, three, four, or more, without limitation in this disclosure. In the embodiments of this disclosure, for a technical feature, the technical features within the technical feature are differentiated by "first," "second," "third," "A," "B," "C," and "D," and there is no sequence or size order between the technical features described by "first," "second," "third," "A," "B," "C," and "D."

The correspondences shown in the tables in this disclosure can be configured or predefined. The values of the information in each table are merely examples and can be configured to other values; this disclosure does not limit them. When configuring the correspondence between configuration information and parameters, it is not necessarily required to configure all the correspondences shown in the tables. For example, in the tables of this disclosure, some of the correspondences shown may not be configured. Alternatively, appropriate modifications can be made based on the above tables, such as splitting, merging, etc. The parameter names shown in the titles of the above tables can also use other names understandable to the communication device, and the parameter values or representation methods can also use other values or representation methods understandable to the communication device. The above tables can also use other data structures in implementation, such as arrays, queues, containers, stacks, linear lists, pointers, linked lists, trees, graphs, structures, classes, heaps, hash tables, or hash maps, etc.

"Predefined" in this disclosure can be understood as defined, pre-defined, stored, pre-stored, pre-negotiated, pre-configured, solidified, or pre-burned.

Those skilled in the art can realize that, in combination with the various examples of units and algorithm steps described in the embodiments disclosed in this document, they can be implemented with electronic hardware, or a combination of computer software and electronic hardware. Whether these functions are executed as hardware or software depends on the specific application and design constraints of the technical solution. Professionals can use different methods to implement the functions described for each specific application, but such implementation should not be considered beyond the scope of this disclosure.

Those skilled in the art can clearly understand that, for convenience and brevity of description, the specific working processes of the systems, devices, and units described in the foregoing can refer to the corresponding processes in the aforementioned method embodiments, and are not described in detail here.

The above describes only specific embodiments of this disclosure, but the scope of protection of this disclosure is not limited to this. Any technical personnel familiar with this field within the technical scope disclosed in this disclosure can easily think of changes or substitutions, all of which should be covered within the scope of protection of this disclosure. Therefore, the scope of protection of this disclosure should be based on the scope of protection defined by the claims.

The invention claimed is:

1. A method for Small Data Transmission (SDT) processing in a Non-Terrestrial Network (NTN), executed by a terminal device, comprises:

determining location information of the terminal device, wherein the location information comprises a change in a distance from the terminal device to a network-side device, and wherein the change in the distance from the terminal device to the network-side device indicates an increase or decrease in the distance from the terminal device to the network-side device compared to a last obtained or recorded distance from the terminal device to the network-side device; and performing a determination of an SDT transmission condition based on the location information of the terminal device.

2. The method according to claim 1, wherein, performing the determination of the SDT transmission condition, comprises:

determining whether a Timing Advance (TA) value for the SDT is valid or not valid based on the location information.

3. The method according to claim 2, wherein, determining whether the TA value for the SDT is valid or not valid comprises at least one of:

for the SDT using configured grant resource allocation, in response to the location information meeting a first preset condition, determining that the TA value for the SDT is valid; or for the SDT using the configured grant resource allocation, in response to the location information meeting the first preset condition and Reference Signal Receiving Power (RSRP) change information meeting a first change condition, determining that the TA value for the SDT is valid.

4. The method according to claim 3, wherein the location information meeting the first preset condition comprises at least one of:

the increase in the distance from the terminal device to the network-side device compared to the last obtained or recorded distance from the terminal device to the network-side device is equal to or less than a first distance threshold, the decrease in the distance compared to the last obtained or recorded distance is equal to or less than the first distance threshold, an increase in a Round Trip Time (RTT) between the terminal device and the network-side device compared to a last obtained or recorded RTT between the terminal device and the network-side device is equal to or less than a first time threshold, a decrease in the RTT compared to the last obtained or recorded RTT is equal to or less than the first time threshold, an increase in a TA value estimated by the terminal device relative to a currently used TA value is equal to or less than a first TA threshold, or a decrease in the TA value estimated by the terminal device relative to the currently used TA value is equal to or less than the first TA threshold; and the RSRP change information meeting the first change condition, comprises:

an absolute value of a difference between a currently measured RSRP value of a downlink pathloss reference and a stored RSRP value of downlink pathloss reference is less than a first RSRP threshold.

5. The method according to claim 1, wherein, performing the determination of the SDT transmission condition comprises:

determining whether to initiate the SDT based on the location information.

6. The method according to claim 5, wherein, determining whether to initiate the SDT based on the location information comprises one of:

in response to the location information meeting a second preset condition, determining to initiate the SDT; or in response to the location information meeting the second preset condition and Reference Signal Receiving Power (RSRP) change information meeting a second change condition, determining to initiate the SDT.

7. The method according to claim 6, wherein the location information of meeting the second preset condition, comprises at least one:

the distance from the terminal device to the network-side device is less than a second distance threshold, a Round Trip Time (RTT) between the terminal device and the network-side device is less than a second time threshold, an increase in a Timing Advance (TA) value estimated by the terminal device relative to a currently used TA value is equal to or less than a second TA threshold, a decrease in the TA value estimated by the terminal device relative to the currently used TA value is equal to or less than the second TA threshold; and the RSRP change information meeting the second change condition, comprises:

a currently measured RSRP value of a downlink pathloss reference is greater than a second RSRP threshold.

8. The method according to claim 1, wherein performing the determination of the SDT transmission condition comprises:

based on the location information, determining whether to initiate message 3 (Msg3) of a four-step random access process for initial access of the SDT or to initiate message A (MsgA) of a two-step random access process for initial access of the SDT.

9. The method according to claim 8, wherein, based on the location information, determining whether to initiate the Msg3 of the four-step random access process for the initial access of the SDT or to initiate the MsgA of the two-step random access process for the initial access of the SDT, comprises one of:

in response to the location information meeting a third preset condition, initiating the MsgA of the two-step random access process for the initial access of the SDT;

in response to the location information not meeting the third preset condition, initiating the Msg3 of the four-step random access process for the initial access of the SDT;

in response to the location information meeting the third preset condition and Reference Signal Receiving Power (RSRP) change information meeting a third change condition, initiating the MsgA of the two-step random access process for the initial access of the SDT; or in response to the RSRP change information not meeting the third change condition, initiating the Msg3 of the four-step random access process for the initial access of the SDT.

10. The method according to claim 9, wherein the location information meeting the third preset condition, comprises at least one of:

the distance from the terminal device to the network-side device is less than a third distance threshold, a Round Trip Time (RTT) between the terminal device and the network-side device is less than a third time threshold, an increase in a Timing Advance (TA) value estimated by the terminal device relative to a currently used TA value is equal to or less than a third TA threshold, and a decrease in the TA value estimated by the terminal device relative to the currently used TA value is equal to or less than the third TA threshold; and the RSRP change information meeting the third change condition, comprises:

a currently measured RSRP value of downlink pathloss reference is greater than a third RSRP threshold value.

11. The method according to claim 1, wherein, performing the determination of the SDT transmission condition comprises:

determining whether to initiate the SDT on a Supplemental UpLink (SUL) or a Normal UpLink (NUL) based on the location information.

12. The method according to claim 11, wherein, determining whether to initiate the SDT on the SUL or the NUL based on the location information comprises:

in response to the location information meeting a fourth preset condition, initiating the SDT on the SUL;

in response to the location information not meeting the fourth preset condition, initiating the SDT on the NUL;

in response to the location information meeting a fifth preset condition and Reference Signal Receiving Power (RSRP) change information meeting a fourth change condition, initiating the SDT on the NUL;

in response to the location information not meeting the fifth preset condition, initiating the SDT on the SUL;

in response to the RSRP change information not meeting the fourth change condition, initiating the SDT on the SUL;

in response to the location information meeting a sixth preset condition and the RSRP change information meeting a fifth change condition, initiating the SDT on the SUL;

in response to the location information not meeting the sixth preset condition, initiating the SDT on the NUL; or in response to the RSRP change information not meeting the fifth change condition, initiating the SDT on the NUL.

13. The method according to claim 12, wherein the location information meeting the fourth preset condition comprises at least one of:

the distance from the terminal device to the network-side device is greater than a fourth distance threshold, a Round Trip Time (RTT) between the terminal device and the network-side device is greater than a fourth time threshold, an increase in a Timing Advance (TA) value estimated by the terminal device relative to a currently used TA value is equal to or greater than a fourth TA threshold, or a decrease in the TA value estimated by the terminal device relative to the currently used TA value is equal to or greater than the fourth TA threshold;

the location information meeting the fifth preset condition comprises at least one of:

the distance is less than a fifth distance threshold, or the RTT between the terminal device and the network-side device is less than a fifth time threshold;

the RSRP change information meeting the fourth change condition includes:

a currently measured RSRP value of downlink pathloss reference is greater than a fourth RSRP threshold value;

the location information meeting the sixth preset condition comprises at least one of:

the distance is greater than a sixth distance threshold, or the RTT between the terminal device and the network-side device is greater than a sixth time threshold; and the RSRP change information meeting the fifth change condition comprises:

the currently measured RSRP value of downlink pathloss reference is less than a fifth RSRP threshold value.

14. The method according to claim 1, wherein performing the determination of the SDT transmission condition includes:

determining whether a Time Alignment Timer (TAT) has timed out based on the location information.

15. The method according to claim 14, wherein, determining whether the TAT has timed out comprises:

in response to the location information meeting a seventh preset condition, determining that the TAT has timed out, wherein the location information meeting the seventh preset condition comprises at least one of:

the distance from the terminal device to the network-side device is greater than a seventh distance threshold, a Round Trip Time (RTT) between the terminal device and the network-side device is greater than a seventh time threshold, an increase in a Timing Advance (TA) value estimated by the terminal device relative to a currently used TA value is equal to or greater than a fifth TA threshold, or a decrease in the TA value estimated by the terminal device relative to the currently used TA value is equal to or greater than the fifth TA threshold.

16. The method according to claim 1, further comprises: in a case a timer starts timing after transmission is initiated on a dedicated Physical Uplink Shared Channel (PUSCH) resource configured by the NTN, performing an enhanced process on the timer.

17. The method according to claim 16, wherein performing the enhanced process on the timer comprises:

offsetting a start time of the timer by one Round Trip Time (RTT) between the terminal device and a base station; or increasing a timing value of the timer by one RTT between the terminal device and the base station, and wherein the timer is any one of:

a configured grant timer for the SDT;

a configured grant retransmission timer for the SDT;

a first preset timer, wherein the terminal device is allowed to initiate retransmission automatically after the first preset timer has timed out; or a second preset timer, wherein the terminal device waits for feedback from the base station during the second preset timer timing.

18. A communication device comprising a processor; and a memory storing a computer program, and wherein the processor executes the computer program to enable the communication device to perform the method according to claim 1.

19. A non-transitory computer-readable storage medium for storing instructions, wherein, when the instructions are executed, the method according to claim 1 is implemented.

20. A method for Small Data Transmission (SDT) processing in a Non-Terrestrial Network (NTN), executed by a network-side device, comprises:

receiving an SDT random access request sent by a terminal device, wherein the SDT random access request carries an SDT indication, which is configured to inform the network-side device that wireless access signaling will be used to carry small data packets; and in response to the SDT random access request, sending a random access response to the terminal device, wherein the random access response carries an uplink configured grant resource allocated to the terminal device and threshold configuration information, and wherein the threshold configuration information is used as a determining criterion for the terminal device to perform a determination of an SDT transmission condition based on location information of the terminal device, wherein the location information comprises a change in a distance from the terminal device to the network-side device, and wherein the change in the distance from the terminal device to the network-side device indicates an increase or decrease in the distance from the terminal device to the network-side device compared to a last obtained or recorded distance from the terminal device to the network-side device.

* * * * *